(12) United States Patent
Chikahisa et al.

(10) Patent No.: US 12,269,105 B2
(45) Date of Patent: Apr. 8, 2025

(54) CONTROL DEVICE FOR WIRE SPARK EROSION MACHINE AND CONTROL METHOD FOR WIRE SPARK EROSION MACHINE

(71) Applicant: Mitsubishi Electric Corporation, Tokyo (JP)

(72) Inventors: Koichiro Chikahisa, Tokyo (JP); Takayuki Nakagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/725,150

(22) PCT Filed: Jun. 27, 2022

(86) PCT No.: PCT/JP2022/025513
§ 371 (c)(1),
(2) Date: Jun. 28, 2024

(87) PCT Pub. No.: WO2024/003980
PCT Pub. Date: Jan. 4, 2024

(65) Prior Publication Data
US 2025/0058391 A1 Feb. 20, 2025

(51) Int. Cl.
*B23H 7/20* (2006.01)
*B23H 7/02* (2006.01)

(52) U.S. Cl.
CPC ............. *B23H 7/20* (2013.01); *B23H 7/02* (2013.01)

(58) Field of Classification Search
CPC ............. B23H 7/20; B23H 7/02; B23H 7/04
See application file for complete search history.

(56) References Cited

U.S. PATENT DOCUMENTS 4,346,278 A * 8/1982 Bhattacharyya ....... B23H 1/024
219/69.18
11,267,059 B2 3/2022 Nakashima
(Continued)

FOREIGN PATENT DOCUMENTS

CN 104039491 A 9/2014
DE 19740714 A1 * 9/1998 ............. B23H 1/022
(Continued)

OTHER PUBLICATIONS

International Search Report and Written Opinion mailed on Sep. 6, 2022, received for International Application No. PCT/JP2022/025513, filed on Jun. 27, 2022, 8 pages including English Translation.
(Continued)

*Primary Examiner* — Kidest Bahta
(74) *Attorney, Agent, or Firm* — XSENSUS LLP

(57) ABSTRACT

Provided is a control device for a wire spark erosion machine, the control device controlling a drive trajectory of an electrode, a machining speed, and an electrical discharge frequency, the control device including a storage device and a computation device. The storage device stores at least one of data selected from an inter-electrode average voltage, the electrical discharge frequency, the machining speed, and the drive trajectory in an (n−1)-th machining, where n is an integer of two or more. The computation device calculates an inter-electrode distance in an n-th machining using a calculation model indicating a relationship between the data in the (n−1)-th machining and a machining shape of the workpiece, and computes, from the inter-electrode distance, at least one command value selected from the machining speed, the electrical discharge frequency, and the drive trajectory in the n-th machining.

11 Claims, 13 Drawing Sheets

(56) References Cited

U.S. PATENT DOCUMENTS

| | | | |
|---|---|---|---|
| 11,724,324 B2 | 8/2023 | Chu | |
| 2011/0100959 A1 | 5/2011 | Onodera et al. | |
| 2014/0330423 A1* | 11/2014 | Hara | B23H 7/20 |
| | | | 700/162 |
| 2015/0239055 A1* | 8/2015 | Niu | G05B 19/4103 |
| | | | 219/69.12 |
| 2018/0257159 A1* | 9/2018 | Descaillot | B23H 11/00 |
| 2020/0290142 A1 | 9/2020 | Chu | |

FOREIGN PATENT DOCUMENTS

| | | | |
|---|---|---|---|
| JP | 2018-169934 A | 11/2018 |
| JP | 2020-146788 A | 9/2020 |
| JP | 6972443 B1 | 11/2021 |
| WO | 2010/001472 A1 | 1/2010 |
| WO | 2013/105235 A1 | 7/2013 |

OTHER PUBLICATIONS

Decision to Grant mailed on Dec. 6, 2022, received for JP Application 2022-563088, 5 pages including English Translation.
Chinese Office Action issued Dec. 4, 2024, in corresponding Chinese Patent Application No. 202280085103.5, 12pp.

* cited by examiner

<CONTROL EXAMPLE IN FIRST EMBODIMENT>

CONTROL DEVICE FOR WIRE SPARK EROSION MACHINE AND CONTROL METHOD FOR WIRE SPARK EROSION MACHINE

CROSS-REFERENCE TO RELATED APPLICATION

This application is a national stage application, pursuant to 35 U.S.C. § 371, of International Patent Application No. PCT/JP2022/025513, filed Jun. 27, 2022, the entire contents of which are incorporated herein by reference.

FIELD

The present disclosure relates to a control device for a wire spark erosion machine and a control method for a wire spark erosion machine for controlling a wire spark erosion machine that machines a workpiece by applying a voltage between the workpiece and an electrode and causing electrical discharge.

BACKGROUND

A spark erosion machining device is a device that machines a workpiece by generating arc discharge between electrodes, i.e. between the machining electrode and the workpiece. The spark erosion machining device requires a power source for generating electrical discharge between the electrodes. By applying a high voltage between the electrodes or shortening the distance between the electrodes to increase the electric field strength, electrical discharge is generated due to dielectric breakdown, and the removal machining of the workpiece is performed. For causing electrical discharge again after the completion of electrical discharge and dielectric recovery, because the distance between the electrodes is large, it is necessary to apply a high voltage between the electrodes or narrow the space between the electrodes to increase the electric field intensity. Machining with the spark erosion machining device is repeated a plurality of times under varying machining conditions that depend on the target dimensions and the accuracy of surface roughness. Specifically, rough machining is first performed as a process of producing the target shape from the workpiece, and thereafter, shape correction machining is performed as a process of improving the accuracy of the shape and reducing the surface roughness in accordance with the target shape.

In the shape correction machining, it is required to improve the accuracy of the surface roughness while correcting the deviation of the shape generated in the previous and earlier machinings including rough machining. In which direction and how much the shape is deviated with respect to the machining progress direction in the previous and earlier machinings vary depending on the shape of the machining sample, the machining progress direction, the machining conditions, and the like.

The shape correction machining requires the ability to perform machining according to the target dimensions regardless of changes in the machining amount to be corrected depending on the machining location and the direction with respect to the machining progress direction. If the shape cannot be corrected according to the target dimensions in the shape correction machining, the inter-electrode distance varies depending on the machining location, resulting in a high possibility that variations in surface roughness and machining dimensions increase. Therefore, Patent Literature 1 discloses a technique of monitoring the inter-electrode average machining voltage to detect the machining state including the electrical discharge frequency and the machining amount during spark erosion machining, and controlling the relative movement speed between the machining electrode and the workpiece such that the inter-electrode average machining voltage becomes a set voltage.

CITATION LIST

Patent Literature

Patent Literature 1: Japanese Patent Application Laid-open No. 2020-146788

SUMMARY OF INVENTION

Problem to be Solved by the Invention

In the case of estimating the inter-electrode distance with the voltage or the electrical discharge frequency, the voltage or the electrical discharge frequency fluctuates at a high frequency. If feedback control is performed by directly monitoring the voltage or the electrical discharge frequency, the fluctuation of the control target becomes too large. Therefore, as in the above-described conventional technique, a control system obtained by averaging these is used. However, in such a control system, because the fluctuation in relative movement speed is gentle, if there is a shape including a rapid change in inter-electrode distance as a result of the previous and earlier machinings, shape correction cannot be sufficiently performed due to a delay in the control system, and the shape variation cannot be eliminated, which is problematic.

The present disclosure has been made in view of the above, and an object thereof is to provide a control device for a wire spark erosion machine capable of performing shape correction machining with higher accuracy than before even when there is a sudden change in shape as a result of the previous machining.

Means to Solve the Problem

In order to solve the above-described problems and achieve the object, the present disclosure is a control device for a wire spark erosion machine that machines a workpiece by applying a voltage between the workpiece and an electrode and causing electrical discharge, the control device being configured to control a drive trajectory of the electrode with respect to the workpiece, a relative machining speed between the workpiece and the electrode, and an electrical discharge frequency of a voltage periodically applied between the electrode and the workpiece, the control device including a storage device and a computation device. The storage device stores at least one piece of data selected from an inter-electrode average voltage that is a voltage applied between the workpiece and the electrode, the electrical discharge frequency, the machining speed, and the drive trajectory in an (n−1)-th machining out of n times of machining in a predetermined machining section of the workpiece, where n is an integer of two or more. The computation device calculates an inter-electrode distance in an n-th machining using a calculation model indicating a relationship between the data in the (n−1)-th machining and a machining shape of the workpiece, and computes, from the inter-electrode distance in the n-th machining, at least one command value selected from the machining speed, the electrical discharge frequency, and the drive trajectory in the n-th machining corresponding to a machining amount required for achieving a desired shape that is based on a machining program for machining the machining section.

Effects of the Invention

The control device for the wire spark erosion machine according to the present disclosure can achieve the effect of performing shape correction machining with higher accuracy than before even when there is a sudden change in shape as a result of the previous machining.

DESCRIPTION OF EMBODIMENTS

Hereinafter, a control device for a wire spark erosion machine and a control method for a wire spark erosion machine according to embodiments of the present disclosure will be described in detail with reference to the drawings.

First Embodiment

Figure 1:
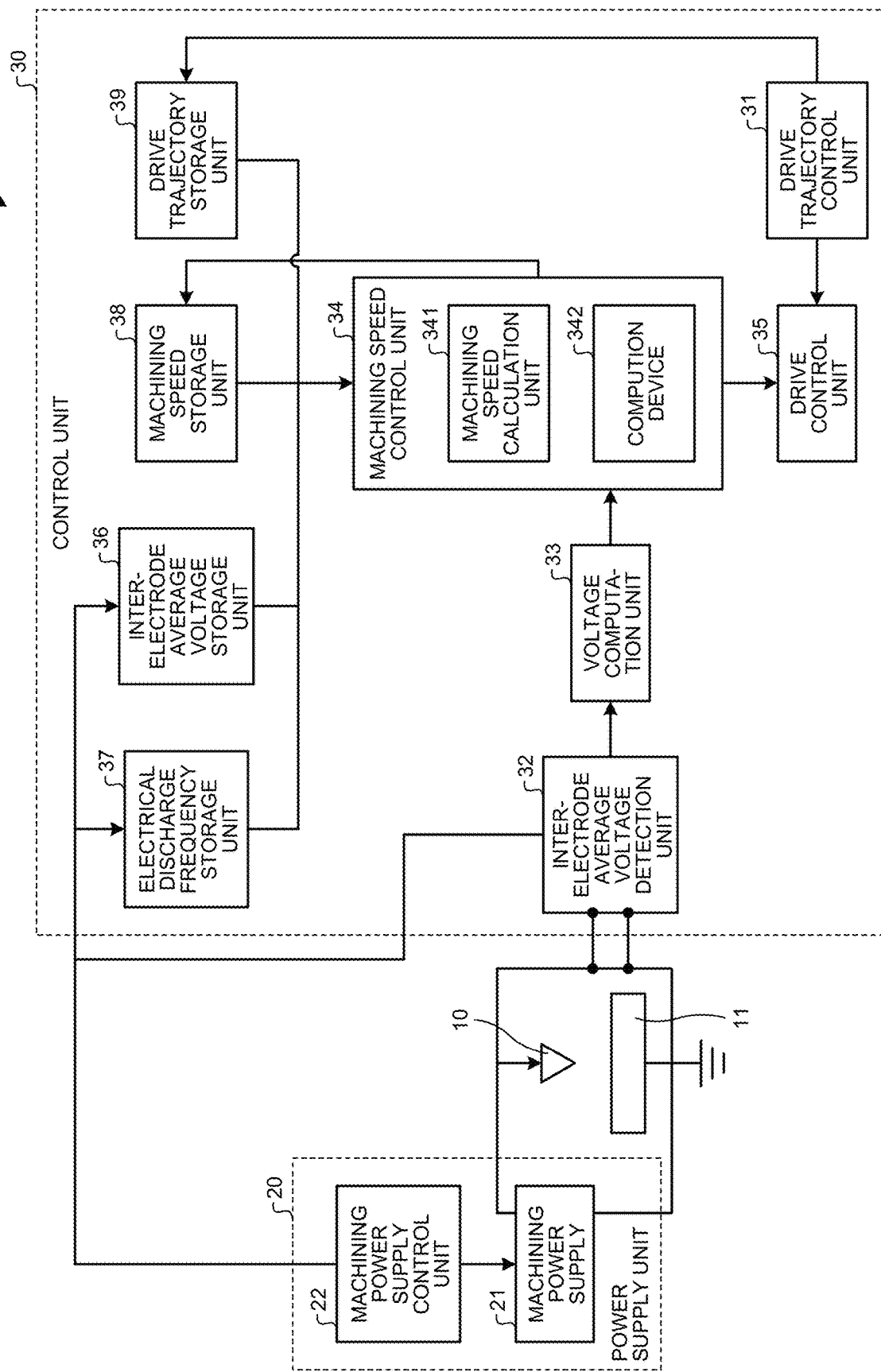
FIG. 1 is a block diagram illustrating an exemplary configuration of a wire spark erosion machine according to the first embodiment.

FIG. 1 is a block diagram illustrating an exemplary configuration of a wire spark erosion machine according to the first embodiment. The wire spark erosion machine 1 includes a machining electrode 10, a power supply unit 20, and a control unit 30. The power supply unit 20 and the control unit 30 correspond to a control device for the wire spark erosion machine 1.

The wire spark erosion machine 1 is a machining device that repeatedly machines a predetermined machining section of the workpiece 11 n times. Here, n is an integer of two or more. At this time, in each machining, the machining conditions, that is, the distance between the workpiece 11 and the machining electrode 10 and the electrical energy are changed. In one example, machining is performed such that the electrical energy decreases as the number of times of machining increases. In the n-th machining, shape correction machining that improves surface roughness and shape accuracy is performed. Among the n times of machining, the first to (n−1)-th machinings are referred to as rough machining, and the n-machining is referred to as shape correction machining.

The machining electrode 10 is an electrode made of a wire-shaped conductive material, that is, a wire electrode. Although the machining electrode 10 has a configuration that allows for machining of the workpiece 11 with wire, FIG. 1 illustrates a simplified configuration of the machining electrode 10. In one example, the machining electrode 10 is fed from the wire bobbin and subjected to a direction change by the feed roller such that the machining electrode 10 is disposed in the vertical direction. The machining electrode 10 performs spark erosion machining on the workpiece 11 while passing through the hole of the upper die and the hole of the lower die. After passing through the lower die, the machining electrode 10 is subjected to a direction change by the lower roller and collected in the collection box by the collection roller.

The power supply unit 20 includes a machining power supply 21 and a machining power supply control unit 22. The machining power supply 21 applies a voltage between the machining electrode 10 and the workpiece 11. The machining power supply control unit 22 controls on and off of the machining power supply 21. The wire spark erosion machine 1 applies a voltage between the workpiece 11 and the machining electrode 10 to generate electrical discharge, thereby performing spark erosion machining on the workpiece 11. Here, a detailed description of the power supply unit 20 including a mechanical structure is omitted because it is not the gist of the present disclosure.

The control unit 30 controls the machining speed from the inter-electrode average voltage between the machining electrode 10 and the workpiece 11. The machining speed is a relative speed between the machining electrode 10 and the workpiece 11.

The control unit 30 includes a drive trajectory control unit 31, an inter-electrode average voltage detection unit 32, a voltage computation unit 33, a machining speed control unit 34, a drive control unit 35, an inter-electrode average voltage storage unit 36, an electrical discharge frequency storage unit 37, a machining speed storage unit 38, and a drive trajectory storage unit 39.

The drive trajectory control unit 31 controls the movement of the axis of the wire spark erosion machine 1 according to the machining program. That is, the drive trajectory control unit 31 calculates the command value of the drive trajectory of the machining electrode 10 with respect to the workpiece 11. In one example, the drive trajectory control unit 31 tells, from the machining program, whether the machining shape of the machining section to be machined is a linear shape or a curved shape, and calculates the drive trajectory that is the path of the machining electrode 10. In the case of a curved shape, the drive trajectory is calculated using the corner diameter in which the radius of the corner portion constituting the curved shape, the diameter of the machining electrode 10, and the offset amount are considered, and the opening angle of the corner portion. The drive trajectory control unit 31 outputs the calculated command value of the drive trajectory to the drive control unit 35. The drive trajectory control unit 31 stores the drive trajectory in the drive trajectory storage unit 39.

The inter-electrode average voltage detection unit 32 detects the inter-electrode average voltage, i.e. the average value of voltages between the machining electrode 10 and the workpiece 11 in a predetermined period of time. The inter-electrode average voltage detection unit 32 stores the detected inter-electrode average voltage in the inter-electrode average voltage storage unit 36. The inter-electrode average voltage detection unit 32 also estimates the electrical discharge status including the electrical discharge frequency and the machining amount from the inter-electrode average voltage in every predetermined period of time, and stores the estimated electrical discharge frequency in the electrical discharge frequency storage unit 37.

The voltage computation unit 33 computes the difference between the detected inter-electrode average voltage and a set voltage. In machining with the wire spark erosion machine 1, the electrical discharge status considered to be appropriate, including the electrical discharge frequency and the machining amount, varies depending on the machining conditions, and an appropriate inter-electrode average voltage is determined depending on the purpose. Therefore, as the set voltage, a voltage considered to be appropriate is set in advance according to the purpose.

The machining speed control unit 34 includes a machining speed calculation unit 341 that calculates the machining speed, and a computation device 342 that calculates a correction value for correcting the machining speed calculated by the machining speed calculation unit 341. The machining speed calculation unit 341 calculates the machining speed such that the inter-electrode average voltage measured within the predetermined period of time becomes the set voltage, that is, the difference calculated by the voltage computation unit 33 becomes zero. For the calculation of the machining speed by the machining speed calculation unit 341, a known method can be used. In one example, the machining speed calculation unit 341 can compute the command value of the machining speed using at least one piece of data of the inter-electrode average voltage, the electrical discharge frequency, and the drive trajectory in the current machining that is the n-th machining. Note that the machining speed calculation unit 341 corresponds to a command value calculation unit.

When the machining section to be machined has a linear shape, the machining speed calculation unit 341 calculates the machining speed through proportional integral (PI) control such that the difference between the inter-electrode average voltage and the set voltage becomes zero. When the machining section has a curved shape, the machining speed calculation unit 341 calculates the machining speed by consideration of the corner diameter of the corner portion constituting the curved shape at the drive position and the opening angle of the corner portion in addition to the inter-electrode average voltage and the set voltage.

In addition, the machining speed calculation unit 341 corrects the calculated machining speed using the correction value calculated by the computation device 342 in the case of shape correction machining that improves surface roughness and shape accuracy. Hereinafter, the machining speed corrected with the correction value is referred to as the post-correction machining speed when distinguished from the uncorrected machining speed. In addition, the uncorrected machining speed and the corrected machining speed are referred to as the machining speed when not distinguished from each other.

In the case of shape correction machining that improves surface roughness and shape accuracy, the computation device 342 calculates the inter-electrode distance in the current machining using a calculation model indicating the relationship between at least one piece of data selected from the inter-electrode average voltage, the electrical discharge frequency, the machining speed, and the drive trajectory in the previous machining and the machining shape of the workpiece 11. In addition, the computation device 342 computes, from the inter-electrode distance in the current machining, the command value of the machining speed in the current machining corresponding to the machining amount required for achieving the desired shape that is based on the machining program for machining the machining section. When machining is performed n times in the machining section, the previous machining corresponds to the (n−1)-th machining, and the current machining corresponds to the n-th machining. At least one piece of data selected from the inter-electrode average voltage, the electrical discharge frequency, the machining speed, and the drive trajectory in the previous machining is, for example, data indicating a profile. The calculation model indicates the relationship between the above data and the machining shape of the workpiece 11, but may indicate the relationship between the above data and the inter-electrode distance in the current machining.

The machining speed calculated by the machining speed calculation unit 341 is for making the calculated machining shape of the workpiece 11 obtained by performing the (n−1)-th machining based on the machining program into the desired shape. The calculated machining shape of the workpiece 11 often does not correspond to the actual machining shape of the workpiece 11. The command value of the machining speed computed by the computation device 342 is a command value for eliminating the difference between the actual machining shape of the workpiece 11 obtained as a result of the previous machining and the desired machining shape, and is also a correction value for correcting the machining speed calculated by the machining speed calculation unit 341. Therefore, the command value of the machining speed calculated by the computation device 342 is also referred to as a correction value. Technically, the actual machining shape of the workpiece 11 obtained as a result of the previous machining is also a machining shape estimated through calculation. However, because the estimation is performed using at least one piece of data selected from the inter-electrode average voltage, the electrical discharge frequency, the machining speed, and the drive trajectory in the previous machining, the machining shape estimated using the above data is closer to the actual machining shape than the calculated machining shape of the workpiece 11 obtained by performing the (n−1)-th machining based on the machining program.

For estimating the inter-electrode distance, a calculation model is obtained in advance which describes the relationship between at least one piece of data selected from the inter-electrode average voltage, the electrical discharge frequency, the machining speed, and the drive trajectory during the previous machining and the machining shape of the workpiece 11. Then, by using a function including this calculation model, the inter-electrode distance in the current machining is calculated, and the command value of the machining speed for achieving the desired shape is further calculated. Regarding the calculation model, the accuracy of the estimated inter-electrode distance increases as the number of pieces of data selected from the inter-electrode average voltage, the electrical discharge frequency, the machining speed, and the drive trajectory during the previous machining increases. Therefore, it is desirable to use as many types of data as possible from among the inter-electrode average voltage, the electrical discharge frequency, the machining speed, and the drive trajectory during the previous machining. The machining speed control unit 34 outputs the calculated command value of the machining speed to the drive control unit 35.

The drive control unit 35 controls the operation of the machining electrode 10 with respect to the workpiece 11 based on the command value of the drive trajectory from the drive trajectory control unit 31 and the command value of the machining speed from the machining speed control unit 34. That is, the position of the machining electrode 10 with respect to the workpiece 11 is controlled based on the command value of the drive trajectory, and the relative speed of the machining electrode 10 with respect to the workpiece 11 is controlled based on the command value of the machining speed. The drive control unit 35 may move the workpiece 11 based on the command values, may move the machining electrode 10 based on the command values, or may move the workpiece 11 and the machining electrode 10 based on the command values.

The inter-electrode average voltage storage unit 36 stores the value of the inter-electrode average voltage detected in every predetermined period of time by the inter-electrode average voltage detection unit 32. As described above, the wire spark erosion machine 1 continuously machines the machining section n times. Then, at the last n-th time, shape correction machining that increases the accuracy of the shape according to the desired shape and reduces the surface roughness is performed. That is, machining is repeatedly performed a plurality of times under varying machining conditions. In the first embodiment, the inter-electrode average voltage storage unit 36 only needs to be able to store at least the inter-electrode average voltage in the machining immediately before the shape correction machining, that is, the (n−1)-th machining. In one example, the inter-electrode average voltage storage unit 36 stores the value of the inter-electrode average voltage in association with the coordinate value of the drive trajectory at the time of each machining. In addition, the inter-electrode average voltage storage unit 36 may store no-load time, which is a period of time from the application of a voltage to the occurrence of electrical discharge, but stores the inter-electrode average voltage in this description. The inter-electrode average voltage may be measured by the machining power supply control unit 22.

The electrical discharge frequency storage unit 37 stores the value of the electrical discharge frequency estimated by the inter-electrode average voltage detection unit 32. The electrical discharge frequency storage unit 37 only needs to be able to store at least the electrical discharge frequency in the machining immediately before the shape correction machining, that is, the (n−1)-th machining. In one example, the electrical discharge frequency storage unit 37 stores the electrical discharge frequency in association with the coordinate value of the drive trajectory at the time of each machining. The electrical discharge frequency may be measured by the machining power supply control unit 22.

The machining speed storage unit 38 stores the command value of the machining speed calculated by the machining speed control unit 34. The machining speed storage unit 38 only needs to be able to store at least the machining speed in the machining immediately before the shape correction machining, that is, the (n−1)-th machining. In one example, the machining speed storage unit 38 stores the command value of the machining speed in association with the coordinate value of the drive trajectory at the time of each machining.

The drive trajectory storage unit 39 stores the drive trajectory from the drive trajectory control unit 31. When the machining section has a linear shape, a coordinate value relative to a predetermined position is stored as the drive trajectory. When the machining section is a corner portion, the drive trajectory at the corner portion including the radius and the opening angle of the corner position is also stored in addition to the coordinate value. The drive trajectory storage unit 39 only needs to be able to store at least the drive trajectory in the machining immediately before the shape correction machining, that is, the (n−1)-th machining.

The inter-electrode average voltage storage unit 36, the electrical discharge frequency storage unit 37, the machining speed storage unit 38, and the drive trajectory storage unit 39 correspond to a storage device.

Here, the control of the machining speed for a linear shape and the control of the machining speed for a curved shape in the shape correction machining will be described.

First, the control of the machining speed for a linear shape will be described. In the wire spark erosion machine 1, the power supply unit 20 applies a voltage between the electrodes in order to continuously generate electrical discharge for machining. The inter-electrode average voltage detection unit 32 measures the inter-electrode average voltage in every predetermined period of time. In addition, the inter-electrode average voltage detection unit 32 can estimate the electrical discharge status including the electrical discharge frequency and the machining amount from the inter-electrode average voltage in every predetermined period of time. The electrical discharge frequency, the machining amount, and the like that are considered to be appropriate vary depending on the machining conditions, and an appropriate inter-electrode average voltage is determined depending on the purpose. That is, for the set voltage, a voltage considered to be appropriate is set in advance as the set voltage according to the purpose. The voltage computation unit 33 acquires the inter-electrode average voltage measured by the inter-electrode average voltage detection unit 32, and calculates the difference between the inter-electrode average voltage and the set voltage. The voltage computation unit 33 outputs the calculated difference to the machining speed control unit 34.

When acquiring the difference from the voltage computation unit 33, the machining speed calculation unit 341 of the machining speed control unit 34 calculates the machining speed such that the difference calculated by the voltage computation unit 33 becomes zero. The drive trajectory control unit 31 calculates the command value of the drive trajectory according to the machining program. The drive control unit 35 controls the operation of the machining electrode 10 based on the command value of the machining speed calculated by the machining speed control unit 34 and the command value of the drive trajectory calculated by the drive trajectory control unit 31.

Figure 2:
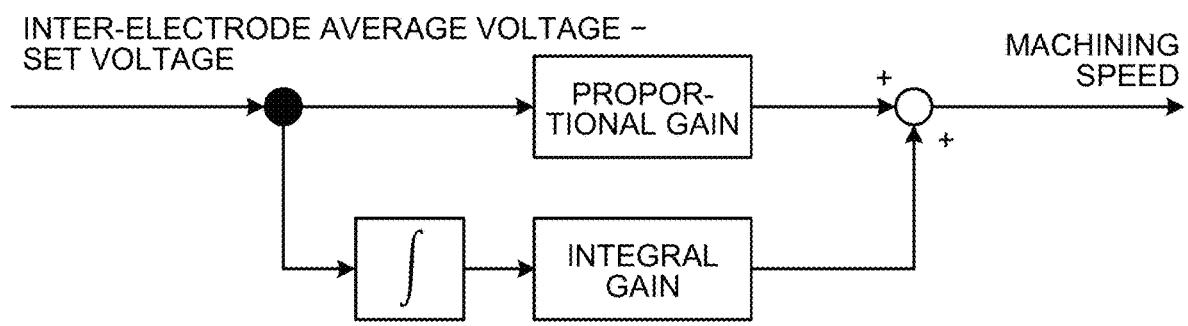
FIG. 2 is a block diagram illustrating an example of a PI control system.

At this time, if the machining speed calculation unit 341 of the machining speed control unit 34 directly converts the voltage calculated from the difference between the inter-electrode average voltage with large fluctuation and the set voltage into a speed, rapid speed fluctuation occurs, and shape accuracy and surface roughness deteriorate. Therefore, the machining speed calculation unit 341 obtains the machining speed using a PI control system such as the one illustrated in FIG. 2. FIG. 2 is a block diagram illustrating an example of a PI control system. As illustrated in FIG. 2, in the PI control system, proportional control is performed by multiplying the difference between the inter-electrode average voltage and the set voltage by a predetermined proportional gain, integral control is performed by multiplying the integral gain according to the accumulation amount of deviation, and the machining speed is determined by adding these results.

Figure 3:
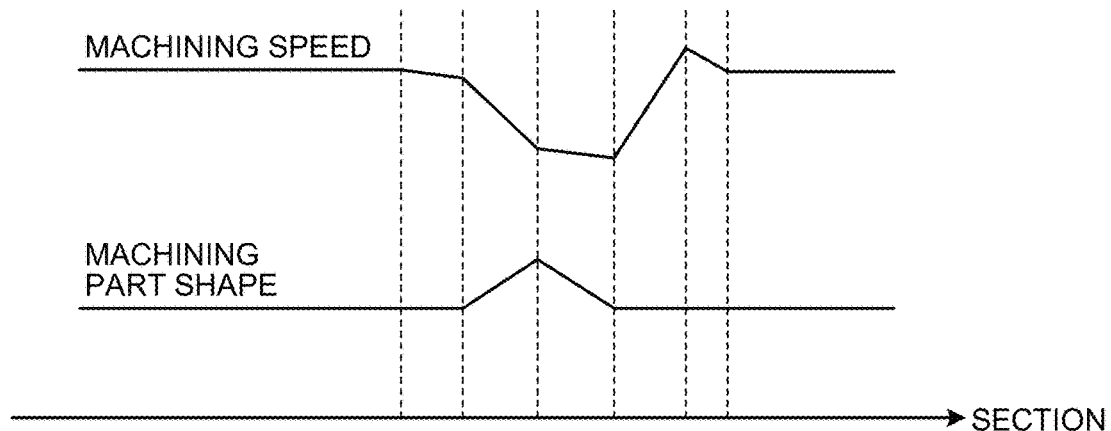
FIG. 3 is a diagram illustrating an example of the relationship between the machining part shape and the machining speed in a conventional PI control system.

FIG. 3 is a diagram illustrating an example of the relationship between the machining part shape and the machining speed in a conventional PI control system. FIG. 3 illustrates a case where there is a small unevenness in the machining part shape which is the resultant shape of the previous machining. In a PI control system such as the one illustrated in FIG. 2, if the gain of the integral term is small, the integral term reacts as a whole to the presence of a frequency component, which weakens the integral term and slows the reaction. For this reason, in the case of machining the workpiece 11 having the machining part shape as illustrated in FIG. 3, it takes time until the machining speed calculated from the inter-electrode average voltage reaches a speed at which the unevenness can be corrected, and the shape cannot be sufficiently corrected. That is, the machining part shape cannot be sufficiently corrected due to a delay in the speed control system. In the example of FIG. 3, the machining speed decreases even after the apex of the machining part shape. In addition, the machining speed excessively increases after the apex of the machining part shape, resulting in oscillation. In this way, the shape correction machining that is based only on PI control cannot produce the desired shape.

Therefore, in the control system according to the first embodiment, the position in the previous machining performed before the shape correction machining is stored in the drive trajectory storage unit 39, the inter-electrode average voltage is stored in the inter-electrode average voltage storage unit 36, the electrical discharge frequency is stored in the electrical discharge frequency storage unit 37, and the machining speed is stored in the machining speed storage unit 38. Then, the computation device 342 of the machining speed control unit 34 predicts the inter-electrode distance at the current machining of the position in advance from the profiles of the inter-electrode average voltage, the electrical discharge frequency, and the machining speed in the previous machining of the position using the calculation model, and computes the correction value of the machining speed for achieving the desired machining shape from the predicted inter-electrode distance. As described above, the calculation model includes a function for calculating the inter-electrode distance between the machining shape of the workpiece 11 in the previous machining and the machining electrode 10 in the current machining from the profiles of the inter-electrode average voltage, the electrical discharge frequency, and the machining speed in the previous machining. In addition, the calculation model includes a function for specifying the amount of the workpiece 11 to be removed in the current machining using the predicted inter-electrode distance and the distance between the desired machining shape obtained based on the machining program and the machining electrode 10 in the current machining, and calculating the machining speed of the machining electrode 10 for removing this amount of the workpiece 11.

Figure 4:
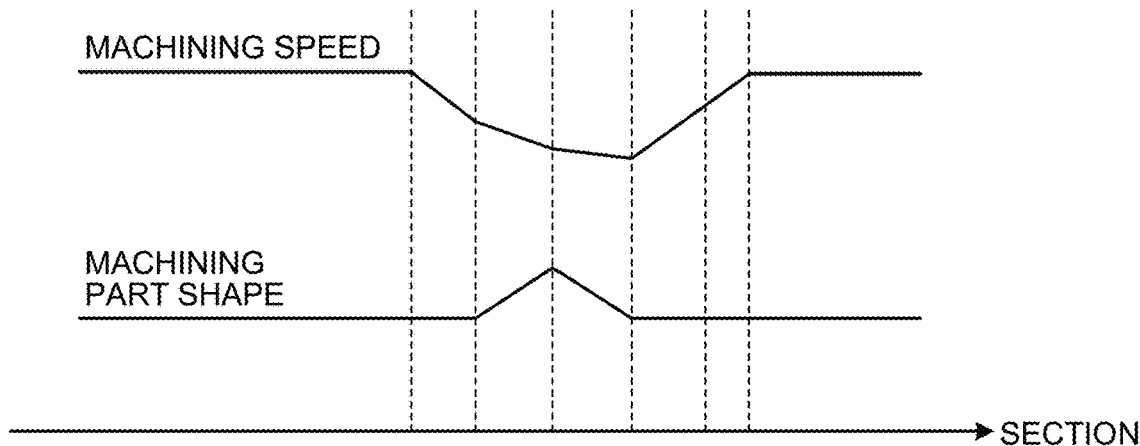
FIG. 4 is a diagram illustrating an example of the relationship between the machining part shape and the machining speed in the control system according to the first embodiment.

FIG. 4 is a diagram illustrating an example of the relationship between the machining part shape and the machining speed in the control system according to the first embodiment. In the first embodiment, the inter-electrode distance is computed, but FIG. 4 illustrates the machining part shape obtained when the inter-electrode distance is computed for easy understanding of the description. In the first embodiment, a projecting shape in the machining section is predicted in advance as illustrated in the machining part shape in FIG. 4. Therefore, the computation device 342 computes the correction value of the machining speed such that the command value of the machining speed decreases before the projecting portion, and reduces the post-correction machining speed calculated by the machining speed calculation unit 341. In addition, the computation device 342 computes the correction value of the machining speed such that the machining speed does not oscillate after passing through the section having the projecting portion. This makes it possible to correct the unevenness on the machined surface of the workpiece 11 without reducing the integral gain or increasing the proportional gain of the PI control system in FIG. 2. Also in FIG. 4, the machining speed decreases even after passing through the apex of the projecting portion. This is related to the fact that machining is performed not only by electrical discharge to the front of the machining electrode 10 but also by electrical discharge to the rear. That is, the machining amount at the front and rear of the machining electrode 10 that has passed the apex of the protrusion is larger than when the machining electrode 10 is at the apex of the projecting portion, and thus the machining speed is reduced. Notable points in FIG. 4 are that the machining speed decreases faster than in the case of FIG. 3, and that the speed does not increase excessively, that is, does not exhibit damped oscillation, after the machining part shape returns to a straight line beyond the projecting portion.

Given that the proportional gain is $K_1$, the integral gain is $K_2$, the set voltage is $V_s$, the inter-electrode average voltage is $V_{ave}$, and the correction value of the machining speed calculated based on the machining part shape in the previous machining is $F_{comp}$, the formula of the PI control system for calculating the post-correction machining speed F is expressed by Formula (1) below. The correction value $F_{comp}$ of the machining speed is calculated using the profiles in the previous machining stored in the inter-electrode average voltage storage unit 36, the electrical discharge frequency storage unit 37, and the machining speed storage unit 38. Specifically, given that the inter-electrode average voltage in the previous machining stored in the inter-electrode average voltage storage unit 36 is $V_{n-1}$, the electrical discharge frequency in the previous machining stored in the electrical discharge frequency storage unit 37 is $S_{n-1}$, and the machining speed in the previous machining stored in the machining speed storage unit 38 is $F_{n-1}$, the correction value F of the machining speed is expressed by Formula (2) below.

$$F = K_1(V_{ave} - V_s) + \int K_2(V_{ave} - V_s) dt + F_{comp} \quad (1)$$

$$F_{comp} = \int f(V_{n-1}, F_{n-1}, S_{n-1}) dt \quad (2)$$

As described above, Formula (2) is a function that includes a calculation model for obtaining the profiles of the inter-electrode average voltage $V_{n-1}$, the electrical discharge frequency $S_{n-1}$, and the machining speed $F_{n-1}$ in the previous machining, and calculating the inter-electrode distance in the current machining from the profiles of the inter-electrode average voltage $V_{n-1}$, the electrical discharge frequency $S_{n-1}$, and the machining speed $F_{n-1}$, and calculates the machining speed from the inter-electrode distance.

Figure 5:
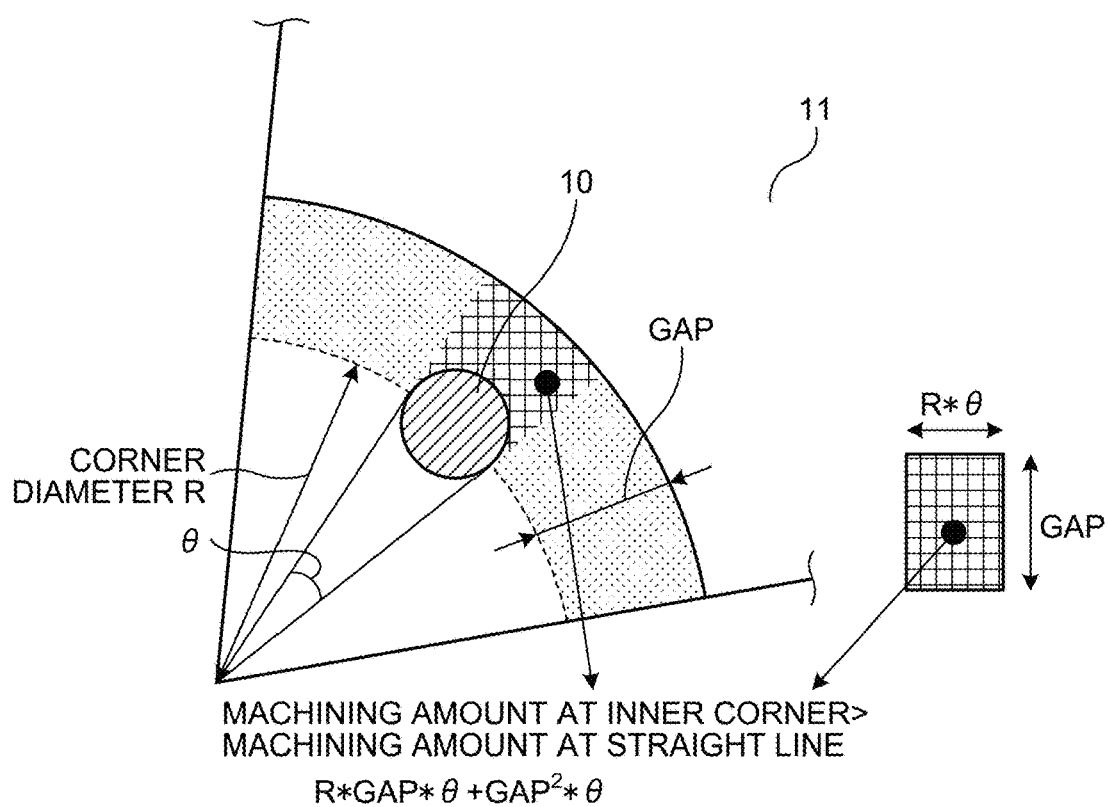
FIG. 5 is a diagram schematically illustrating the machining amount of the workpiece at a corner portion having a curved shape.

Next, the control of the machining speed for a curved shape will be described. FIG. 5 is a diagram schematically illustrating the machining amount of the workpiece at a corner portion having a curved shape. The illustrated case is the machining of the inner corner, i.e. the inner side of the corner portion. It is known that the machining amount at the inner corner with the machining electrode 10 rotating by θ from the center of curvature of the corner portion at the circumferential position of the corner diameter R from the center of curvature is expressed by Formula (3) below. Here, R is the corner diameter in which the diameter and the offset amount of the machining electrode 10 are considered, and θ is the opening angle of the corner portion. The distance between the center of the machining electrode 10 and the surface of the workpiece 11 after machining is represented by GAP.

$$\text{Machining amount at inner corner} = R*GAP*\theta + GAP^2*\theta \quad (3)$$

In Formula (3), the machining electrode 10 is moved by $R*\theta$. The machining amount with the movement of $R*\theta$ in the linear shape machining is expressed by Formula (4) below.

$$\text{Machining amount at linear shape} = R*GAP*\theta \quad (4)$$

Formulas (3) and (4) indicate that the machining amount at the inner corner is larger than the machining amount at the linear shape. That is, for the corner shape, as illustrated in FIG. 5, the required machining amount, that is, the area facing the machining electrode 10, changes as compared with the linear shape, and thus it is necessary to change the inter-electrode average voltage, the electrical discharge frequency, the machining speed, and the like with respect to the change in machining amount. Patent Literature 1 discloses a method of calculating the machining speed and the electrical discharge frequency according to a change in machining amount at a corner portion. However, in the case of performing such feedforward control with respect to the change in machining amount, if the result of the previous machining is not an expected corner shape, the desired corner shape cannot be obtained with the current shape correction machining.

Therefore, in the control system according to the first embodiment, as in the case of the linear shape, the position in the previous machining is stored in the drive trajectory storage unit 39, the inter-electrode average voltage is stored in the inter-electrode average voltage storage unit 36, the electrical discharge frequency is stored in the electrical discharge frequency storage unit 37, and the machining speed is stored in the machining speed storage unit 38. In addition, in the drive trajectory storage unit 39, for the machining of the corner portion, information on the corner portion is also stored in the drive trajectory storage unit 39 together with the position in the previous machining. The information on the corner portion includes the drive trajectory at the corner portion, that is, the radius and the opening angle of the corner portion and the like. The computation device 342 of the machining speed control unit 34 computes a correction value for correcting the machining speed at the position of the corner portion in the current machining from the information on the corner portion stored in the drive trajectory storage unit 39 in addition to the profiles of the electrical discharge frequency, the inter-electrode average voltage, and the machining speed in the previous machining.

Figure 6:
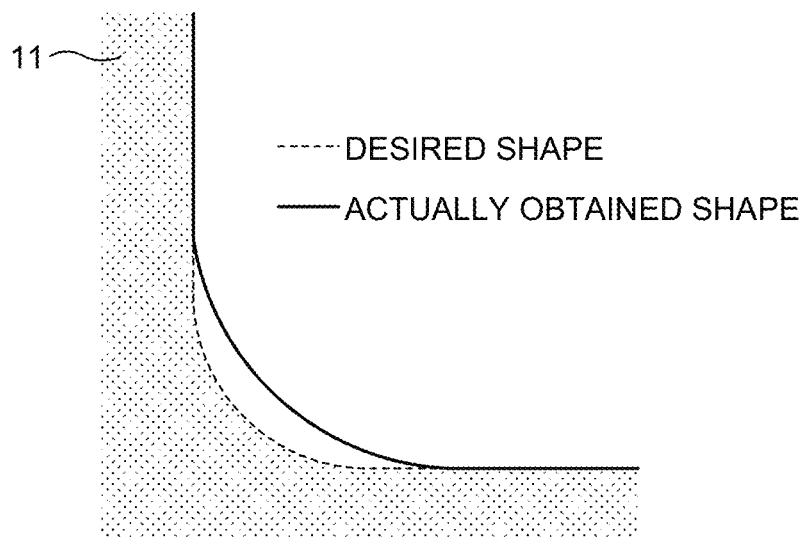
FIG. 6 is a diagram illustrating an example of the machining shape of the workpiece obtained as a result of the previous machining.
Figure 7:
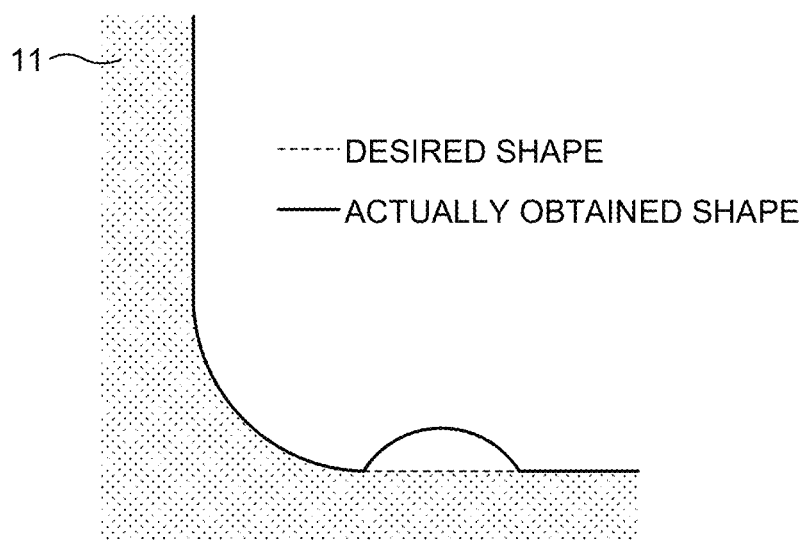
FIG. 7 is a diagram illustrating an example of the machining shape of the workpiece obtained as a result of the previous machining.

FIGS. 6 and 7 are diagrams illustrating examples of the machining shape of the workpiece obtained as a result of the previous machining. In these drawings, broken lines indicate the desired shape, and solid lines indicate the shape actually obtained with the previous machining. FIG. 6 illustrates a case where the corner diameter actually obtained is smaller than the shape of the desired corner portion. FIG. 7 illustrates a case where there is an unevenness in the entrance/exit of the corner portion. In the first embodiment, the computation device 342 computes the inter-electrode distance in the current machining corresponding to the actually obtained shape in FIGS. 6 and 7 using the calculation model, computes the machining speed required for removing the region corresponding to the difference between the actually obtained shape and the desired shape in FIGS. 6 and 7 using the inter-electrode distance, and sets the machining speed as the correction value. By performing machining at the post-correction machining speed corrected with the correction value, it is possible to perform machining that achieves the desired shape. As illustrated in FIGS. 6 and 7, when the shape of the corner portion is smaller than the desired shape as a result of the previous machining, or when there is an unevenness in the entrance/exit of the corner portion, it is possible to improve the shape accuracy after machining by optimizing the machining speed in accordance with these shapes.

A calculation formula for the post-correction machining speed $F_{cnr}$ at the corner portion is expressed by Formula (5) below. Note that the position at which machining is performed at the corner portion is denoted by x. In addition, the function g is a machining speed in which a change in machining amount at the corner portion is considered as compared with the case of the linear shape, and can be obtained with a known method. The correction value $F_{comp\_cnr}$ of the machining speed is calculated with Formula (6) below using the corner diameter, the opening angle, and the position at the corner portion in addition to the profiles in the previous machining stored in the inter-electrode average voltage storage unit 36, the electrical discharge frequency storage unit 37, and the machining speed storage unit 38.

$$F_{cnr} = g(R, \theta, V_s, V_{ave}, x) + F_{comp\_cnr} \quad (5)$$

$$F_{comp\_cnr} = \int h(R, \theta, V_{n-1}, F_{n-1}, S_{n-1}, x) dt \quad (6)$$

As shown in Formulas (5) and (6), at the corner portion, the required machining amount changes as compared with the linear portion according to the position of the machining electrode 10 at the corner portion, and thus the position at the corner portion is included in the function. Formula (5) indicates a case where the function g corrects the difference in machining amount between the corner portion and the linear portion by controlling the machining speed. Alternatively, the function g may correct the difference in machining amount between the corner portion and the linear portion by controlling the electrical discharge frequency or the trajectory. Furthermore, although the above description shows an example of machining the inner corner, the machining speed can be controlled in a similar manner also in the case of machining the outer corner outside the corner portion. In the case of machining the outer corner, the machining amount is smaller than in the case of linear machining.

Figure 8:
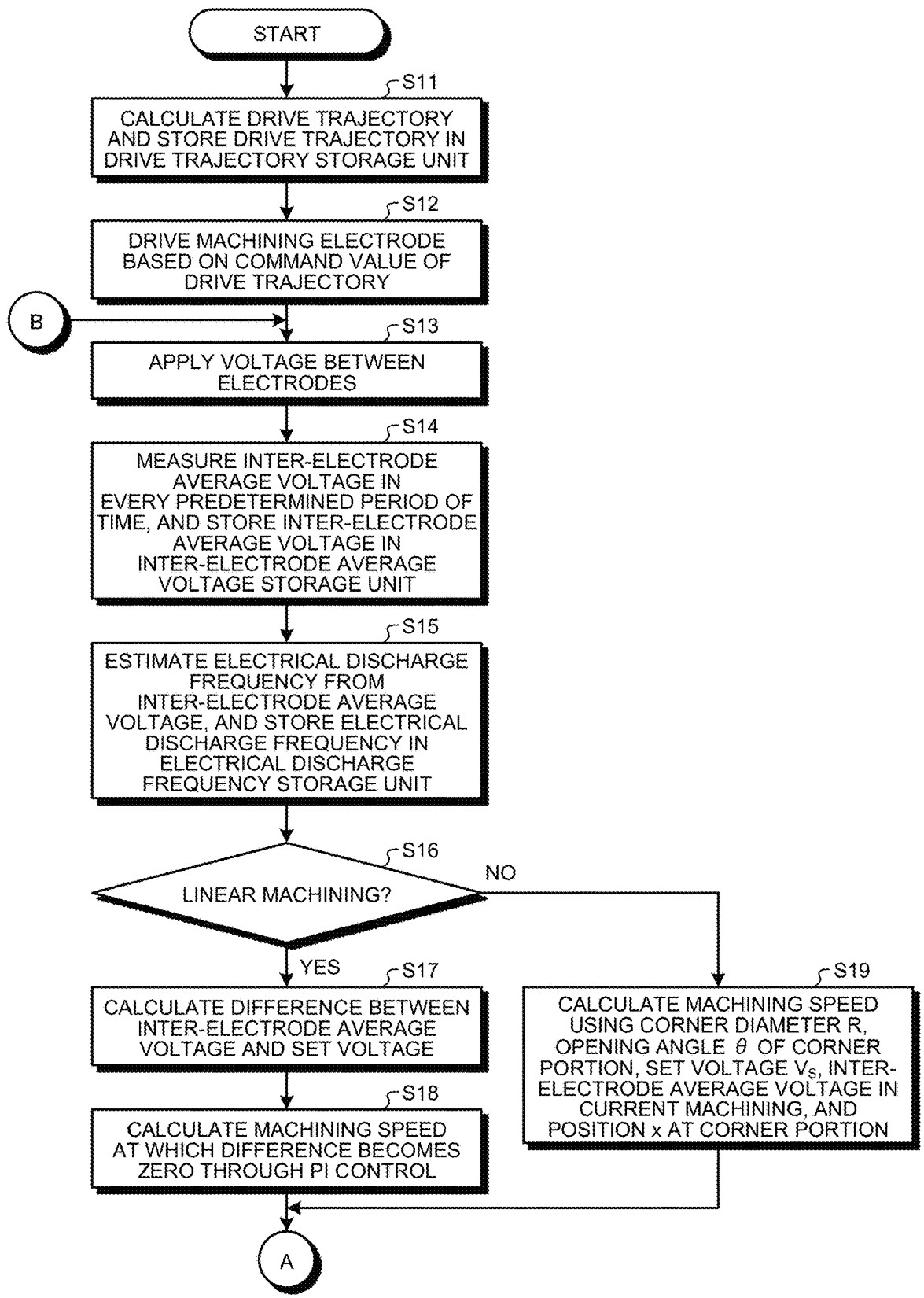
FIG. 8 is a flowchart illustrating an exemplary procedure for the control method for the wire spark erosion machine according to the first embodiment.
Figure 9:
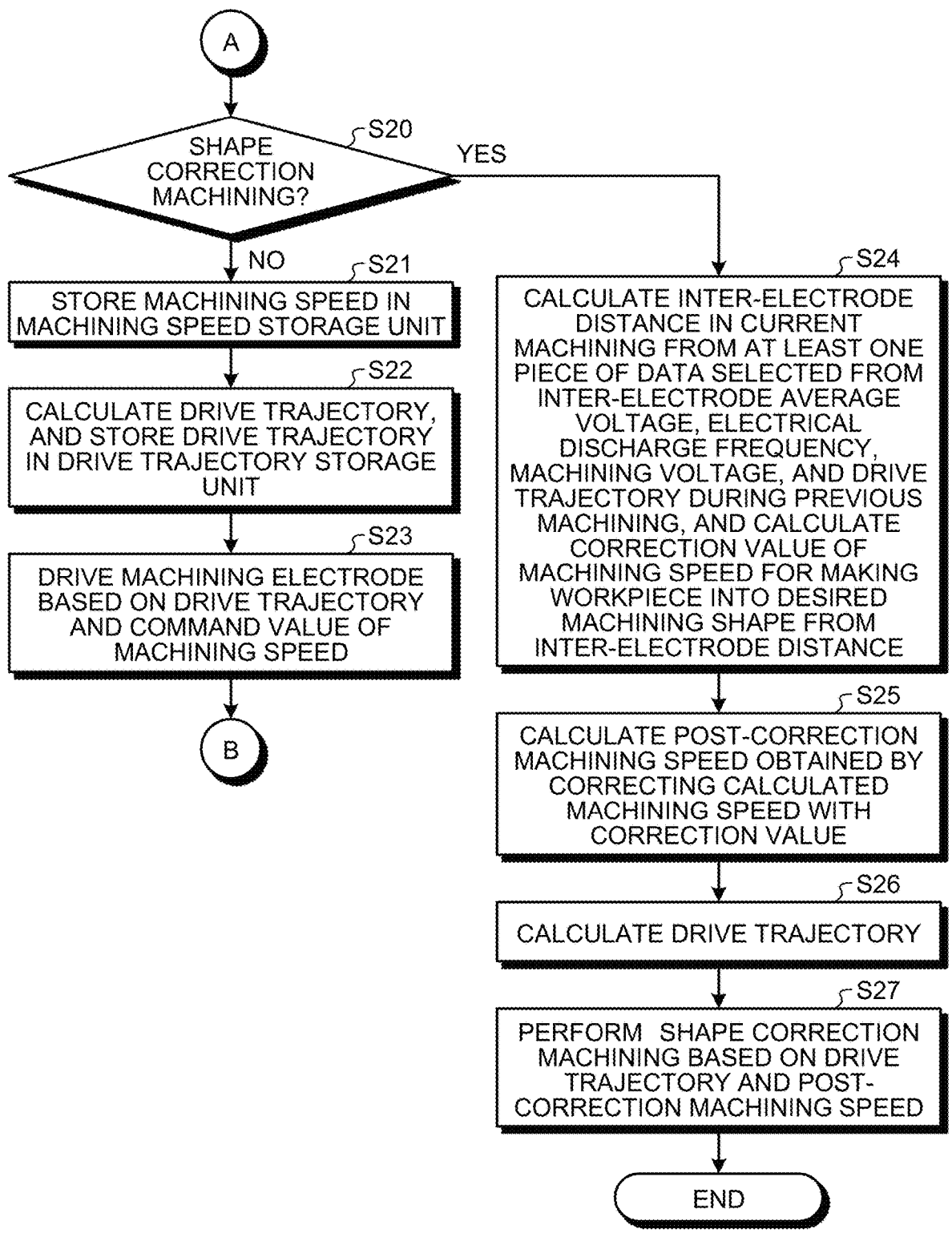
FIG. 9 is a flowchart illustrating an exemplary procedure for the control method for the wire spark erosion machine according to the first embodiment.

Next, a control method for this wire spark erosion machine 1 will be described. FIGS. 8 and 9 are flowcharts illustrating an exemplary procedure for the control method for the wire spark erosion machine according to the first embodiment. First, the drive trajectory control unit 31 calculates the drive trajectory from the machining program, and stores the drive trajectory in the drive trajectory storage unit 39 (step S11). The drive trajectory control unit 31 outputs the calculated drive trajectory to the drive control unit 35. The drive control unit 35 drives the machining electrode 10 based on the command value of the drive trajectory (step S12). Thereafter, the machining power supply control unit 22 controls the machining power supply 21 to apply a voltage between the electrodes at a predetermined electrical discharge frequency (step S13). Thereafter, the inter-electrode average voltage detection unit 32 measures the inter-electrode average voltage in every predetermined period of time, and stores the inter-electrode average voltage which is the measurement result in the inter-electrode average voltage storage unit 36 (step S14). The inter-electrode average voltage detection unit 32 estimates the electrical discharge frequency from the inter-electrode average voltage in every predetermined period of time, and stores the estimated electrical discharge frequency in the electrical discharge frequency storage unit 37 (step S15).

Next, it is determined whether linear machining is performed (step S16). The drive trajectory control unit 31 tells whether linear machining or curved machining is performed when determining the drive trajectory. In response to a determination that linear machining is performed (Yes in step S16), the voltage computation unit 33 calculates the difference between the inter-electrode average voltage acquired from the inter-electrode average voltage detection unit 32 and the set voltage (step S17). The voltage computation unit 33 outputs the calculated difference to the machining speed control unit 34. The machining speed calculation unit 341 of the machining speed control unit 34 calculates the machining speed at which the difference becomes zero through PI control (step S18).

On the other hand, in response to a determination in step S16 that linear machining is not performed, that is, in response to a determination that curved machining is performed (No in step S16), the machining speed calculation unit 341 calculates the machining speed using the corner diameter R, the opening angle θ of the corner portion, the set voltage V_, the inter-electrode average voltage in the current machining, and the position x at the corner portion (step S19). In one example, the machining speed calculation unit 341 calculates the machining speed at which the difference between the inter-electrode average voltage and the set voltage becomes zero by consideration of the corner diameter R and the opening angle θ of the corner portion at the position x in the current machining.

Thereafter or after step S18, the machining speed calculation unit 341 determines whether shape correction machining is performed (step S20). In response to a determination that shape correction machining is not performed (No in step S20), the machining speed calculation unit 341 stores the calculated machining speed in the machining speed storage unit 38 (step S21). The drive trajectory control unit 31 calculates the drive trajectory, and stores the calculated drive trajectory in the drive trajectory storage unit 39 (step S22). Next, the drive control unit 35 drives the machining electrode 10 based on the drive trajectory and the command value of the machining speed (step S23). Thereafter, the process returns to step S13, and rough machining that is not shape correction machining is performed.

On the other hand, in response to a determination in step S20 that shape correction machining is performed (Yes in step S20), the computation device 342 of the machining speed control unit 34 uses Formula (2) or Formula (6) to calculate the inter-electrode distance in the current machining from at least one piece of data selected from the inter-electrode average voltage, the electrical discharge frequency, the machining voltage, and the drive trajectory during the previous machining, and calculates the correction value of the machining speed for making the workpiece 11 into the desired machining shape from the inter-electrode distance (step S24). Next, the machining speed calculation unit 341 uses Formula (1) or Formula (5) to calculate the post-correction machining speed obtained by correcting the calculated machining speed with the correction value (step S25). Thereafter, the drive trajectory control unit 31 calculates the drive trajectory (step S26). Then, the drive control unit 35 performs shape correction machining based on the drive trajectory and the post-correction machining speed (step S27), and the process ends.

In the first embodiment, at least one piece of data selected from the inter-electrode average voltage, the electrical discharge frequency, the machining speed, and the drive trajectory in the (n–1)-th machining out of n times of machining in the machining section is stored, where n is an integer of two or more. The inter-electrode distance in the n-th machining is computed using a calculation model indicating the relationship between the data in the (n–1)-th machining and the machining shape of the workpiece 11. The correction value of the machining speed in the n-th machining corresponding to the machining amount required for achieving the desired shape is computed from the inter-electrode distance in the n-th machining. That is, the machining shape of the workpiece 11 in the (n–1)-th machining, which is the previous machining, can be estimated with high accuracy, and thus the machining can be performed such that the workpiece 11 has the desired shape in the shape correction machining. As a result, it is possible to perform shape correction machining with high accuracy even when there is a sudden change in shape as a result of the previous machining.

In particular, at least one piece of data selected from the inter-electrode average voltage, the electrical discharge frequency, the machining speed, and the drive trajectory in the (n–1)-th machining is data reflecting the state of the (n–1)-th machining, and as described above, the machining shape of the workpiece 11 in the (n–1)-th machining can be estimated by using this data. That is, in the first embodiment, in order to accurately estimate the machining shape of the workpiece 11 in the (n–1)-th machining, at least one piece of data selected from the inter-electrode average voltage, the electrical discharge frequency, the machining speed, and the drive trajectory in the (n–1)-th machining is stored.

Second Embodiment

Figure 10:
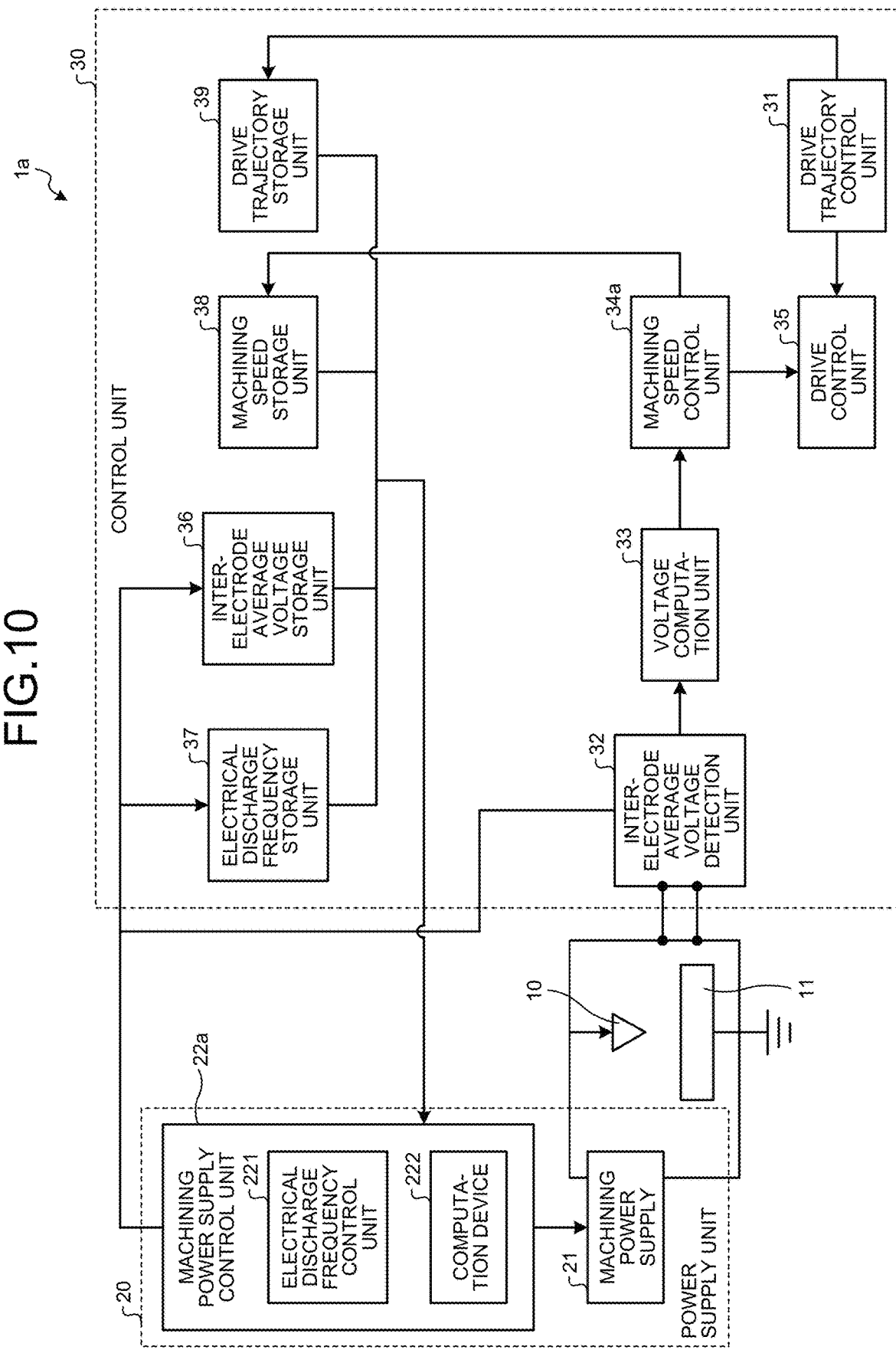
FIG. 10 is a block diagram illustrating an exemplary configuration of a wire spark erosion machine according to the second embodiment.

FIG. 10 is a block diagram illustrating an exemplary configuration of a wire spark erosion machine according to the second embodiment. Note that components identical to those in the first embodiment are denoted by the same reference signs, the description thereof will be omitted, and differences from the first embodiment will be described.

The wire spark erosion machine 1a according to the second embodiment includes a machining speed control unit 34a instead of the machining speed control unit 34, and a machining power supply control unit 22a instead of the machining power supply control unit 22.

The machining speed control unit 34a corresponds to the machining speed calculation unit 341 described in the first embodiment and does not include the computation device 342. That is, the machining speed control unit 34a calculates the machining speed such that the difference calculated by the voltage computation unit 33 becomes zero.

The machining power supply control unit 22a includes an electrical discharge frequency control unit 221 that controls the machining power supply 21 at an electrical discharge frequency determined in advance according to the machining conditions, and a computation device 222 that computes a correction value for correcting the electrical discharge frequency determined in advance according to the machining conditions. The electrical discharge frequency control unit 221 controls the on/off cycle of the machining power supply 21. Note that the electrical discharge frequency control unit 221 may compute the command value of the electrical discharge frequency using at least one piece of data selected from the inter-electrode average voltage, the electrical discharge frequency, and the drive trajectory in the current machining. In the case of shape correction machining that improves surface roughness and shape accuracy, the electrical discharge frequency control unit 221 corrects the predetermined electrical discharge frequency with the correction value computed by the computation device 222, and controls the machining power supply 21 at the post-correction electrical discharge frequency. The electrical discharge frequency control unit 221 corresponds to a command value calculation unit.

In the case of shape correction machining that improves surface roughness and shape accuracy, the computation device 222 calculates the inter-electrode distance in the current machining using a calculation model indicating the relationship between at least one piece of data selected from the inter-electrode average voltage, the electrical discharge frequency, the machining speed, and the drive trajectory in the previous machining and the machining shape of the workpiece 11. In addition, the computation device 222 computes, from the inter-electrode distance in the current machining, the command value of the electrical discharge frequency in the current machining corresponding to the machining amount required for achieving the desired shape that is based on the machining program for machining the machining section. When machining is performed n times in the machining section, the previous machining corresponds to the (n−1)-th machining, and the current machining corresponds to the n-th machining. At least one piece of data selected from the inter-electrode average voltage, the electrical discharge frequency, the machining speed, and the drive trajectory in the previous machining is, for example, data indicating a profile. The electrical discharge frequency is controlled using the electrical discharge pause time of the machining power supply control unit 22a. Here, it is assumed that the computation device 222 calculates the command value of the electrical discharge pause time as the electrical discharge frequency.

The predetermined electrical discharge frequency is for making the calculated machining shape of the workpiece 11 obtained by performing the (n−1)-th machining based on the machining program into the desired shape. The calculated machining shape of the workpiece 11 often does not correspond to the actual machining shape of the workpiece 11. The command value of the electrical discharge frequency computed by the computation device 222 is a command value for eliminating the difference between the actual machining shape of the workpiece 11 obtained as a result of the previous machining and the desired machining shape, and is also a correction value for correcting the predetermined electrical discharge frequency. Therefore, the command value of the electrical discharge frequency calculated by the computation device 222 is also referred to as a correction value. The computation device 222 outputs the correction value to the electrical discharge frequency control unit 221.

For estimating the inter-electrode distance, a calculation model is obtained in advance which describes the relationship between at least one piece of data selected from the inter-electrode average voltage, the electrical discharge frequency, the machining speed, and the drive trajectory during the previous machining and the machining shape of the workpiece 11. Then, by using a function including this calculation model, the command value of the electrical discharge frequency for achieving the desired shape is calculated. Regarding the calculation model, the accuracy of the estimated inter-electrode distance increases as the number of pieces of data selected from the inter-electrode average voltage, the electrical discharge frequency, the machining speed, and the drive trajectory during the previous machining increases. Therefore, it is desirable to use as many types of data as possible from among the inter-electrode average voltage, the electrical discharge frequency, the machining speed, and the drive trajectory during the previous machining. The machining power supply control unit 22a controls the machining power supply 21 using the calculated command value of the electrical discharge pause time.

Specifically, the computation device 222 uses at least one piece of data selected from the inter-electrode average voltage, the electrical discharge frequency, the machining speed, and the drive trajectory during the previous machining to estimate the inter-electrode distance in the current machining at the position reflecting the shape of the workpiece 11 in the previous machining. The computation device 222 computes the correction value of the electrical discharge pause time in addition to the estimation result of the inter-electrode distance such that the desired shape is obtained from the inter-electrode distance. In one example, if the corresponding position is projecting as a result of the previous machining, that is, if the inter-electrode distance is small, the electrical discharge pause time is calculated to be short in order to increase the machining amount. In addition, if the corresponding position is recessed as a result of the previous machining, that is, if the inter-electrode distance is large, the electrical discharge pause time is calculated to be long in order to reduce the machining amount or not to perform machining.

In the control of the machining speed for a linear shape, a formula for calculating the post-correction electrical discharge pause time $OFF_{comp}$ is expressed by Formula (7) below. Here, OFF is the set electrical discharge pause amount during machining, and $C_1$ is the conversion coefficient for the correction value of the machining speed into the correction value of the electrical discharge pause amount. The electrical discharge frequency control unit 221 computes the command value of the post-correction electrical discharge pause time $OFF_{comp}$ by adding the pause amount, which is the correction value calculated by the computation device 222, to the pause time OFF determined in advance according to the machining conditions. By predicting the shape in advance and controlling the electrical discharge frequency in this manner, it is possible to correct the unevenness on the machined surface without reducing the integral gain or increasing the proportional gain of the PI control system.

$$OFF_{comp}=OFF+C_1*\smallint f(V_{n-1},F_{n-1},S_{n-1})dt \quad (7)$$

Also in the control of the machining speed for a curved shape, the difference from the desired shape in the machining shape of the corner portion estimated as a result of the previous machining can be eliminated by the control of the electrical discharge frequency. Specifically, the computation device 222 computes the command value of the electrical discharge frequency at the position of the corner portion from the information on the corner portion stored in the drive trajectory storage unit 39 in addition to the profiles of the previous machining stored in the inter-electrode average voltage storage unit 36, the electrical discharge frequency storage unit 37, and the machining speed storage unit 38. As described above, the information on the corner portion includes the corner diameter, the opening angle of the corner portion, and the like. A calculation formula for the post-correction electrical discharge pause amount $OFF_{comp\_cnr}$ at the corner portion is expressed by Formula (8) below. Here, the conversion coefficient for the correction value of the machining speed into the correction value of the electrical discharge pause amount is represented by $C_2$.

$$OFF_{comp\_cnr}=OFF+C_2*\smallint h(R,\theta,V_{n-1},F_{n-1},S_{n-1},x)dt \quad (8)$$

As illustrated in FIGS. 6 and 7, when the shape of the corner portion is smaller than the desired shape as a result of the previous machining, or when there is an unevenness in the entrance/exit of the corner portion, it is possible to improve the shape accuracy after machining by computing the command value of the electrical discharge frequency in accordance with these shapes.

In the second embodiment, at least one piece of data selected from the inter-electrode average voltage, the electrical discharge frequency, the machining speed, and the drive trajectory in the (n−1)-th machining out of n times of machining in the machining section is stored, where n is an integer of two or more. The inter-electrode distance in the n-th machining is computed using a calculation model indicating the relationship between the data in the (n−1)-th machining and the machining shape of the workpiece 11. The command value of the electrical discharge frequency in the n-th machining corresponding to the machining amount required for achieving the desired shape is computed from the inter-electrode distance in the n-th machining. That is, the machining shape of the workpiece 11 in the (n−1)-th machining, which is the previous machining, can be estimated with high accuracy, and thus the machining can be performed such that the workpiece 11 has the desired shape in the shape correction machining. Consequently, it is possible to perform shape correction machining with high accuracy even when there is a sudden change in shape as a result of the previous machining.

Third Embodiment

Figure 11:
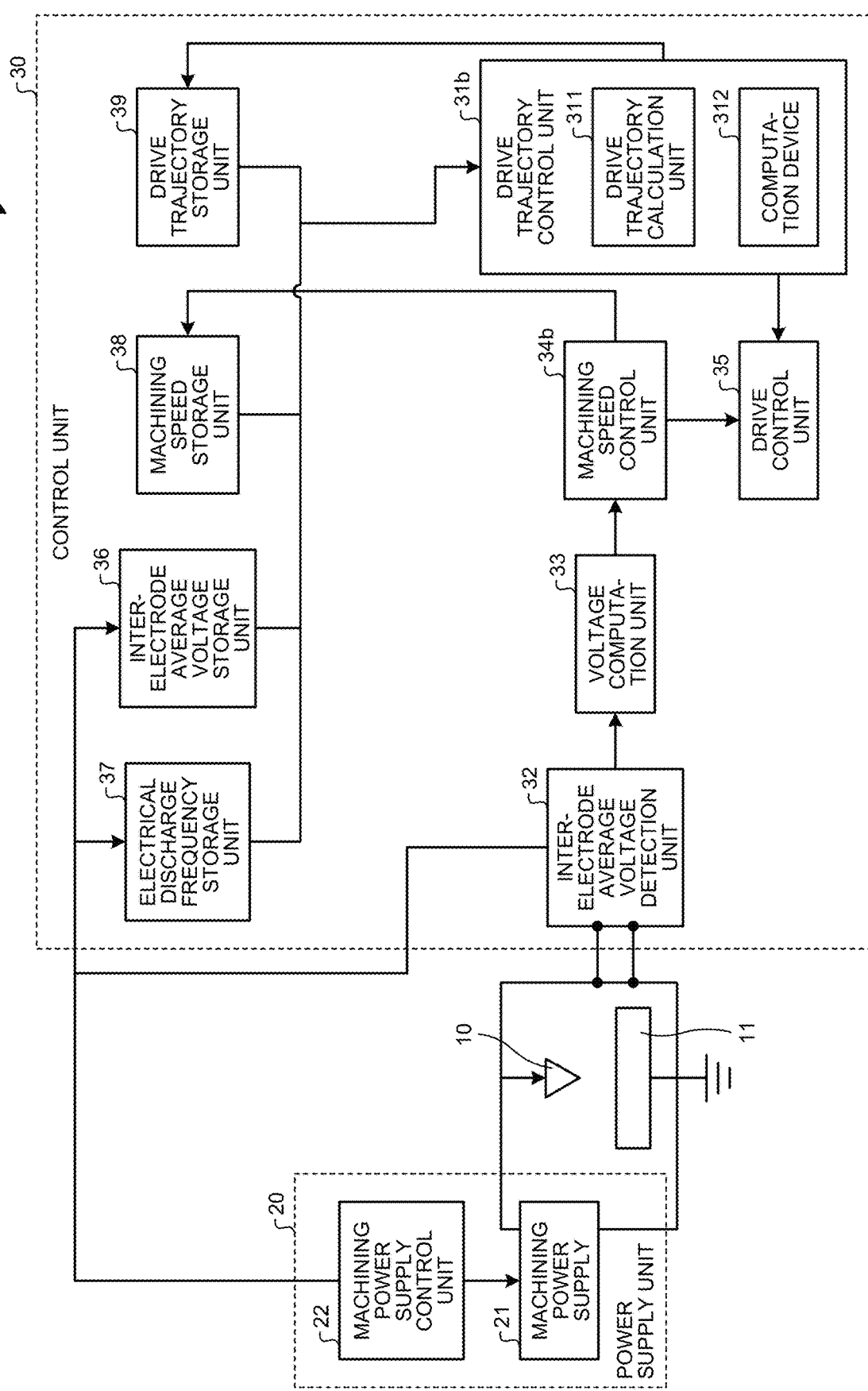
FIG. 11 is a block diagram illustrating an exemplary configuration of a wire spark erosion machine according to the third embodiment.

FIG. 11 is a block diagram illustrating an exemplary configuration of a wire spark erosion machine according to the third embodiment. Note that components identical to those in the first embodiment are denoted by the same reference signs, the description thereof will be omitted, and differences from the first embodiment will be described.

The wire spark erosion machine 1*b* according to the third embodiment includes a machining speed control unit 34*b* instead of the machining speed control unit 34, and a drive trajectory control unit 31*b* instead of the drive trajectory control unit 31.

The machining speed control unit 34*b* corresponds to the machining speed calculation unit 341 described in the first embodiment and does not include the computation device 342. That is, the machining speed control unit 34*b* calculates the machining speed such that the difference calculated by the voltage computation unit 33 becomes zero.

The drive trajectory control unit 31*b* includes a drive trajectory calculation unit 311 that calculates a drive trajectory, and a computation device 312 that computes a correction value for correcting the drive trajectory calculated by the drive trajectory calculation unit 311. The drive trajectory calculation unit 311 calculates the command value of the drive trajectory of the machining electrode 10 according to the machining program. In addition, the drive trajectory calculation unit 311 may compute the command value of the drive trajectory using at least one piece of data selected from the inter-electrode average voltage, the electrical discharge frequency, and the drive trajectory in the current machining. In the case of shape correction machining that improves surface roughness and shape accuracy, the drive trajectory calculation unit 311 corrects the calculated drive trajectory with the correction value computed by the computation device 312, and controls the machining electrode 10 with the post-correction drive trajectory. The drive trajectory calculation unit 311 corresponds to a command value calculation unit.

In the case of shape correction machining that improves surface roughness and shape accuracy, the computation device 312 calculates the inter-electrode distance in the current machining using a calculation model indicating the relationship between at least one piece of data selected from the inter-electrode average voltage, the electrical discharge frequency, the machining speed, and the drive trajectory in the previous machining and the machining shape of the workpiece 11. In addition, the computation device 312 computes, from the inter-electrode distance in the current machining, the command value of the drive trajectory in the current machining corresponding to the machining amount required for achieving the desired shape that is based on the machining program for machining the machining section. The drive trajectory computed here is an axis movement trajectory that is a trajectory along which the axis of the wire spark erosion machine 1*b* is moved. When machining is performed n times in the machining section, the previous machining corresponds to the (n−1)-th machining, and the current machining corresponds to the n-th machining. At least one piece of data selected from the inter-electrode average voltage, the electrical discharge frequency, the machining speed, and the drive trajectory in the previous machining is, for example, data indicating a profile. Hereinafter, the command value of the drive trajectory in the current machining computed by the computation device 312 is also referred to as an axis movement trajectory. The axis movement trajectory is computed in a normal vector direction perpendicular to the vector of the machining direction obtained from the drive trajectory calculated by the drive trajectory calculation unit 311. Note that the normal vector direction is a direction that is perpendicular to the machining direction vector and is not the extending direction of the machining electrode 10.

The drive trajectory calculated by the drive trajectory calculation unit 311 is for making the calculated machining shape of the workpiece 11 obtained by performing the (n−1)-th machining based on the machining program into the desired shape. The calculated machining shape of the workpiece 11 often does not correspond to the actual machining shape of the workpiece 11. The command value of the axis movement trajectory computed by the computation device 312 is a command value for eliminating the difference between the actual machining shape of the workpiece 11 obtained as a result of the previous machining and the desired machining shape, and is also a correction value for correcting the drive trajectory calculated by the drive trajectory calculation unit 311. Therefore, the command value of the axis movement trajectory calculated by the computation device 312 is also referred to as the correction value of the drive trajectory.

For estimating the inter-electrode distance, a calculation model is obtained in advance which describes the relationship between at least one piece of data selected from the inter-electrode average voltage, the electrical discharge frequency, the machining speed, and the drive trajectory during the previous machining and the machining shape of the workpiece 11. Then, by using a function including this calculation model, the command value of the axis movement trajectory for achieving the desired shape is calculated. Regarding the calculation model, the accuracy of the estimated inter-electrode distance increases as the number of pieces of data selected from the inter-electrode average voltage, the electrical discharge frequency, the machining speed, and the drive trajectory during the previous machining increases. Therefore, it is desirable to use as many types of data as possible from among the inter-electrode average voltage, the electrical discharge frequency, the machining speed, and the drive trajectory during the previous machining. The drive trajectory control unit 31b outputs the calculated command value of the drive trajectory to the drive control unit 35.

The axis movement trajectory with respect to the estimated inter-electrode distance is computed in the normal vector direction as described above. In one example, if the corresponding position is projecting as a result of the previous machining, that is, if the inter-electrode distance is small, the axis movement trajectory in the direction of the workpiece 11 is computed in order to eliminate the projecting shape. In addition, if the corresponding position is recessed as a result of the previous machining, that is, if the inter-electrode distance is large, the correction value of the drive trajectory is computed in a direction away from the workpiece 11 in order to eliminate the recessed shape.

In the control of the machining speed for a linear shape, the axis movement trajectory ΔL in the normal direction with respect to the axis progress direction is calculated with Formula (9) below. Here, $C_4$ is the conversion coefficient for the correction value of the machining speed into the axis movement trajectory.

$$\Delta L = C_4 * \int f(V_{n-1}, F_{n-1}, S_{n-1}) dt \qquad (9)$$

Also in the control of the machining speed for a curved shape, the difference from the desired shape in the machining shape of the corner portion estimated as a result of the previous machining can be eliminated by the control of the axis movement trajectory. Specifically, the computation device 312 computes the correction value of the axis movement trajectory at the position of the corner portion from the information on the corner portion stored in the drive trajectory storage unit 39 in addition to the profiles of the previous machining stored in the inter-electrode average voltage storage unit 36, the electrical discharge frequency storage unit 37, and the machining speed storage unit 38. As described above, the information on the corner portion includes the corner diameter, the opening angle of the corner portion, and the like. A calculation formula for the post-correction axis movement trajectory $\Delta L_{comp\_cnr}$ at the corner portion is expressed by Formula (10) below. Here, the conversion coefficient for the correction value of the machining speed into the axis movement trajectory is represented by $C_5$.

$$\Delta L_{comp\_cnr} = C_5 * \int h(R, \theta, V_{n-1}, F_{n-1}, S_{n-1}, x) dt \qquad (10)$$

As illustrated in FIGS. 6 and 7, when the shape of the corner portion is smaller than the desired shape as a result of the previous machining, or when there is an unevenness in the entrance/exit of the corner portion, it is possible to improve the shape accuracy after machining by computing the command value of the drive trajectory in accordance with these shapes.

In the third embodiment, at least one piece of data selected from the inter-electrode average voltage, the electrical discharge frequency, the machining speed, and the drive trajectory in the (n−1)-th machining out of n times of machining in the machining section is stored, where n is an integer of two or more. The inter-electrode distance in the n-th machining is computed using a calculation model indicating the relationship between the data in the (n−1)-th machining and the machining shape of the workpiece 11. The axis movement trajectory in the n-th machining corresponding to the machining amount required for achieving the desired shape is computed from the inter-electrode distance in the n-th machining. That is, the machining shape of the workpiece 11 in the (n−1)-th machining, which is the previous machining, can be estimated with high accuracy, and thus the machining can be performed such that the workpiece 11 has the desired shape in the shape correction machining. Consequently, it is possible to perform shape correction machining with high accuracy even when there is a sudden change in shape as a result of the previous machining.

Fourth Embodiment

In the first to third embodiments, when shape correction machining is performed, a calculation model is used which predicts the inter-electrode distance at the current machining of the position in advance from at least one piece of data selected from the inter-electrode average voltage, the electrical discharge frequency, the machining speed, and the drive trajectory of the previous machining. However, all data of the first to (n−1)-th rough machinings may be stored in the inter-electrode average voltage storage unit 36, the electrical discharge frequency storage unit 37, the machining speed storage unit 38, and the drive trajectory storage unit 39, where n is an integer of two or more and the current machining which is shape correction machining is the n-th machining, so that the computation devices 342, 222, and 312 may estimate the inter-electrode distance in the current machining at the corresponding position using all the data of the first to (n−1)-th rough machinings. This makes it possible to stably estimate the inter-electrode distance even when there is a distortion in the data of the inter-electrode average voltage, the electrical discharge frequency, and the machining speed at the corresponding place in the previous machining due to disturbance. That is, the accuracy of the machining shape of the workpiece 11 obtained as a result of the first to (n−1)-th machinings is improved as compared with the case of using only the data of the (n−1)-th machining.

In the above description, at least one piece of data selected from the inter-electrode average voltage, the electrical discharge frequency, the machining speed, and the drive trajectory in the first to (n−1)-th machinings is used, but at least one piece of data selected from the inter-electrode average voltage, the electrical discharge frequency, the machining speed, and the drive trajectory in two or more of the (n−1)-th and earlier machinings may be used.

In the fourth embodiment, at least one piece of data selected from the inter-electrode average voltage, the electrical discharge frequency, the machining speed, and the drive trajectory in a plurality of machinings before the (n−1)-th machining is further stored in the inter-electrode average voltage storage unit 36, the electrical discharge frequency storage unit 37, the machining speed storage unit 38, and the drive trajectory storage unit 39. The inter-electrode distance in the current machining is estimated using a plurality of pieces of data in the (n−1)-th and earlier machinings. At least one command value selected from the machining speed, the electrical discharge frequency, and the drive trajectory is computed from the inter-electrode distance. This makes it possible to stably estimate the inter-electrode distance even when there is a distortion in the data of the inter-electrode average voltage, the electrical discharge frequency, and the machining speed at the corresponding place in the previous machining due to disturbance.

Fifth Embodiment

In the first to fourth embodiments, in order to enable more accurate shape correction, command values of a plurality of correction values selected from the correction value of the machining speed, the correction value of the electrical discharge frequency, and the correction value of the drive trajectory in the current machining may be computed.

Figure 12:
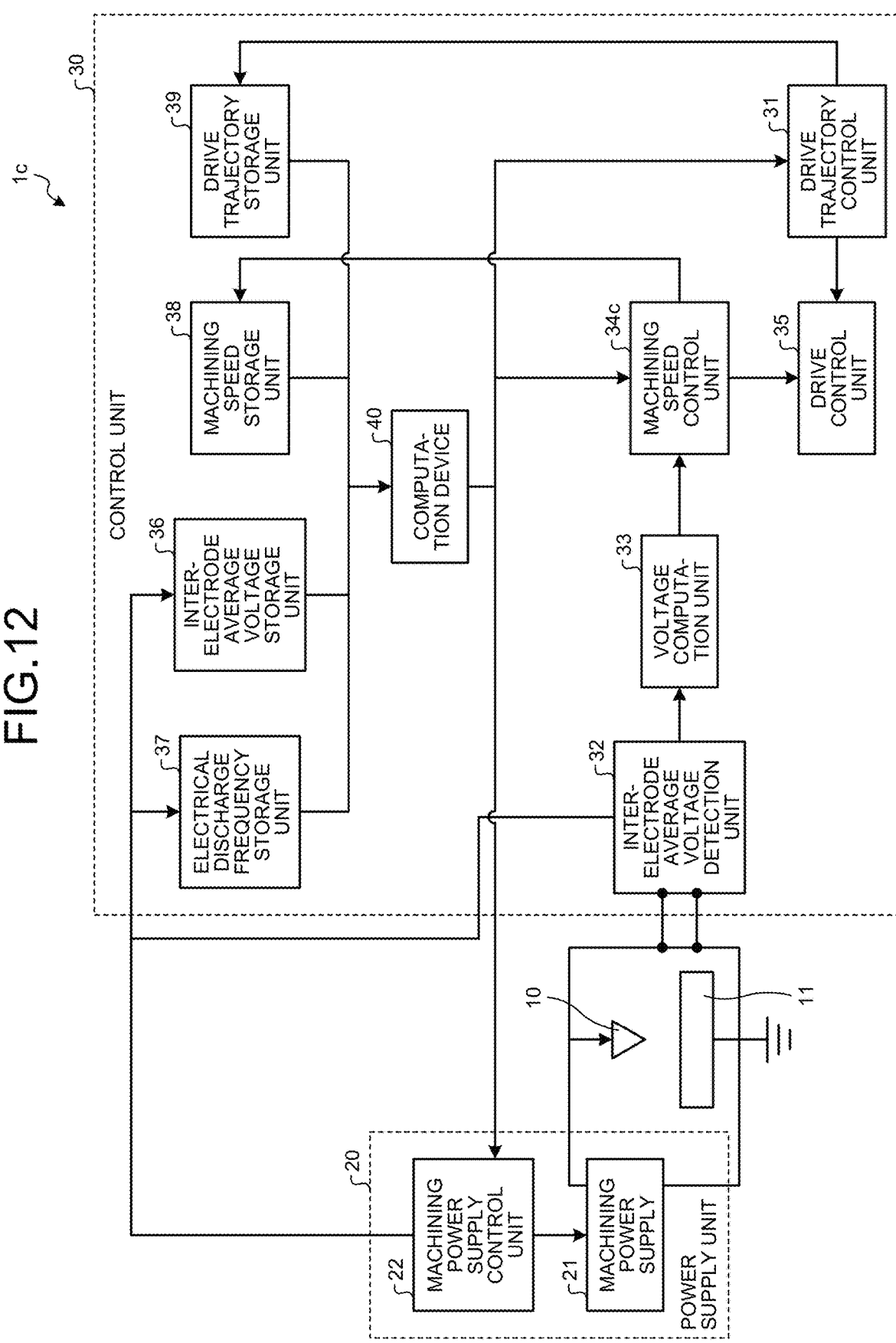
FIG. 12 is a block diagram illustrating an exemplary configuration of a wire spark erosion machine according to the fifth embodiment.

FIG. 12 is a block diagram illustrating an exemplary configuration of a wire spark erosion machine according to the fifth embodiment. Note that components identical to those in the first embodiment are denoted by the same reference signs, the description thereof will be omitted, and differences from the first embodiment will be described.

In the wire spark erosion machine 1c according to the fifth embodiment, the control unit 30 further includes a computation device 40. The computation device 40 is a combination of the functions of the computation devices 342, 222, and 312 described in the first, second, and third embodiments. Specifically, in the case of shape correction machining that improves surface roughness and shape accuracy, the computation device 40 calculates the inter-electrode distance in the current machining using a calculation model indicating the relationship between at least one piece of data selected from the inter-electrode average voltage, the electrical discharge frequency, the machining speed, and the drive trajectory in the previous machining and the machining shape of the workpiece 11. In addition, the computation device 40 computes, from the inter-electrode distance in the current machining, a plurality of correction values selected from the correction value of the machining speed, the correction value of the electrical discharge frequency, and the correction value of the drive trajectory in the current machining corresponding to the machining amount required for achieving the desired shape that is based on the machining program for machining the machining section. The computation device 40 outputs the computation result to the corresponding one of a machining speed control unit 34c, the machining power supply control unit 22, and the drive trajectory control unit 31. Consequently, the command value is corrected by at least two processing units of the machining speed control unit 34c, the machining power supply control unit 22, and the drive trajectory control unit 31. Alternatively, the computation device 40 may selectively use the command value to be corrected among the machining speed, the electrical discharge frequency, and the drive trajectory according to the prediction result of the shape or the inter-electrode distance using the calculation model.

The wire spark erosion machine 1c according to the fifth embodiment includes the machining speed control unit 34c instead of the machining speed control unit 34. The machining speed control unit 34c corresponds to the machining speed calculation unit 341 described in the first embodiment and does not include the computation device 342. That is, the machining speed control unit 34c calculates the machining speed such that the difference calculated by the voltage computation unit 33 becomes zero.

In the above description, the computation device 40 performs computation using at least one piece of data selected from the inter-electrode average voltage, the electrical discharge frequency, the machining speed, and the drive trajectory in the previous machining. However, as in the fourth embodiment, computation may be performed using at least one piece of data selected from the inter-electrode average voltage, the electrical discharge frequency, the machining speed, and the drive trajectory in the previous and earlier machinings.

In the fifth embodiment, the inter-electrode distance is calculated with the calculation model from at least one piece of data selected from the inter-electrode average voltage, the electrical discharge frequency, the machining speed, and the drive trajectory in the previous machining, and a plurality of correction values selected from the correction value of the machining speed, the correction value of the electrical discharge frequency, and the correction value of the drive trajectory in the current machining are computed from the calculated inter-electrode distance. Consequently, the accuracy of machining the workpiece 11 into the desired shape can be improved as compared with the cases of the first to fourth embodiments. In addition, whether it is better to control the machining speed, control the electrical discharge frequency, or control the axis movement trajectory can vary according to the estimation result of the machining shape or the inter-electrode distance in the previous machining of the workpiece 11 estimated by the calculation model. In such a case, the computation device 40 can select the control method determined according to the estimation result of the machining shape or the inter-electrode distance.

Sixth Embodiment

In the description of the first to fifth embodiments, the inter-electrode average voltage, the machining speed, the electrical discharge frequency, and the drive trajectory in the previous machining or in the previous and earlier machinings are stored, and from these results, at least one correction value selected from the machining speed, the electrical discharge frequency, and the drive trajectory is computed in the current machining. The calculation of the correction values of the machining speed, the electrical discharge frequency, and the drive trajectory from the stored profiles is performed using a formula representing the modeled relationship between the inter-electrode distance or the machining shape of the workpiece 11 and the calculation target. However, in practice, the correction value of the calculation target may not be able to be calculated optimally due to, for example, deflection of the machining electrode 10 due to the distance between the upper and lower nozzles at the time of machining, the thickness of the workpiece 11, the machining fluid pressure, or the like, or occurrence of electrical discharge backward in the electrode progress direction that appears at a minute corner. The calculation target here is at least one correction value selected from the machining speed, the electrical discharge frequency, and the drive trajectory calculated from the estimated inter-electrode distance. Therefore, the sixth embodiment describes a method of optimizing a target value, which is a value to be calculated, through machine learning from the relationship between the profiles of the inter-electrode average voltage, machining speed, electrical discharge frequency, and drive trajectory obtained through preliminary machining and the machining result of the workpiece 11, that is, the measurement result of the machining shape of the workpiece 11 after machining.

Hereinafter, the learning phase for generating a learned model and the utilization phase for estimating the command value information of the calculation target using the learned model generated in the learning phase will be sequentially described.

<Learning Phase>

Figure 13:
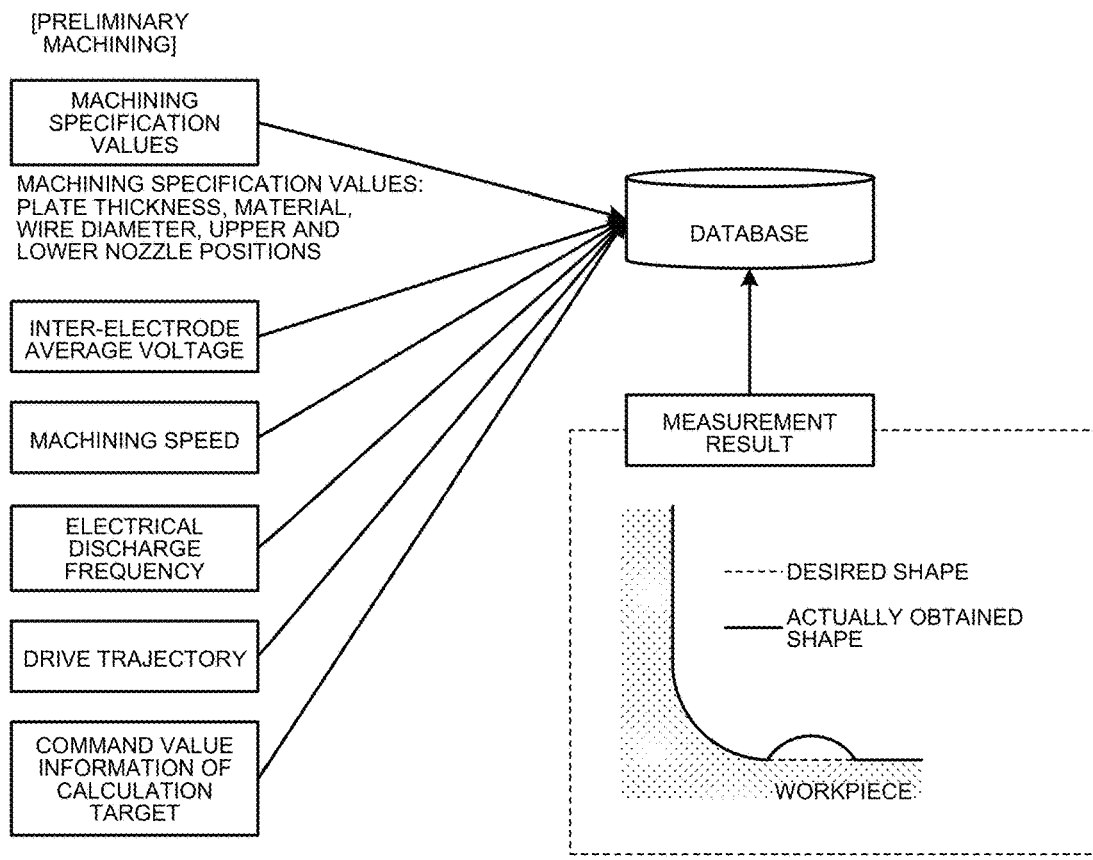
FIG. 13 is a model diagram illustrating an example of the outline of machine learning according to the sixth embodiment.

First, preliminary machining as the learning phase will be described. FIG. 13 is a model diagram illustrating an example of the outline of machine learning according to the sixth embodiment. In the preliminary machining, training data is collected and stored. Specifically, in the preliminary machining, the machining specification values of the workpiece 11, the inter-electrode average voltage, machining speed, electrical discharge frequency, drive trajectory, and command value information of the calculation target in each machining, and the measurement result are acquired, and the relationship between the machining specification values, the inter-electrode average voltage, machining speed, electrical discharge frequency, drive trajectory, and command value information of the calculation target in each machining, and the measurement result is created as a database. Examples of the machining specification values of the workpiece 11 include the plate thickness of the workpiece 11, the material of the workpiece 11, the positions of the upper and lower nozzles, and the wire diameter which is the diameter of the machining electrode 10. The command value information of the calculation target is at least one piece of data selected from the correction value of the machining speed, the correction value of the electrical discharge frequency, and the correction value of the drive trajectory, and is data actually used in the preliminary machining. The measurement result represents, as a numerical value, the error in the machining shape of the workpiece 11 after machining from the desired machining shape.

Figure 14:
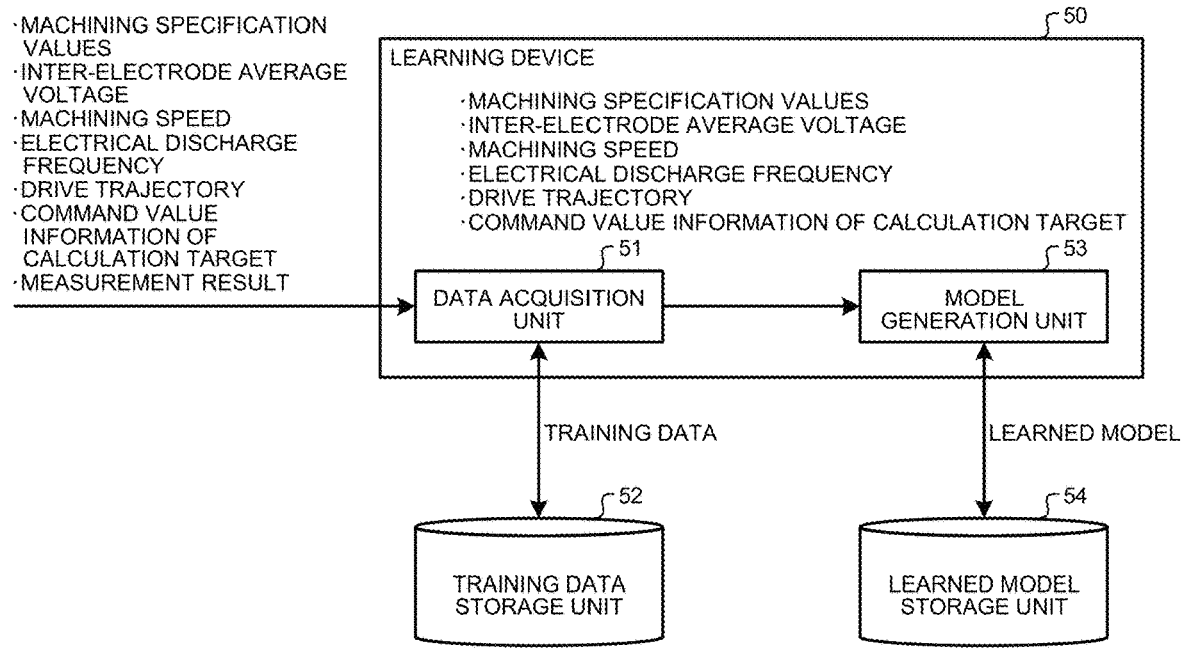
FIG. 14 is a diagram schematically illustrating an exemplary configuration of a learning device used in the control device for the wire spark erosion machine according to the sixth embodiment.

Details of the learning phase will be described below. FIG. 14 is a diagram schematically illustrating an exemplary configuration of a learning device used in the control device for the wire spark erosion machine according to the sixth embodiment. The learning device 50 includes a data acquisition unit 51, a training data storage unit 52, a model generation unit 53, and a learned model storage unit 54.

The data acquisition unit 51 acquires training data. The training data includes the machining specification values of the workpiece 11 in preliminary machining, the inter-electrode average voltage, machining speed, electrical discharge frequency, drive trajectory, and command value information of the calculation target in each machining, and the measurement result. The data acquisition unit 51 outputs the machining specification values, the inter-electrode average voltage, the machining speed, the electrical discharge frequency, the drive trajectory, and the command value information of the calculation target among the acquired training data to the model generation unit 53 as learning data. The data acquisition unit 51 stores the acquired training data in the training data storage unit 52.

It is desirable that the inter-electrode average voltage, the machining speed, the electrical discharge frequency, and the drive trajectory be all included, but at least one of these data should be included. In the following description, a case where all of the inter-electrode average voltage, the machining speed, the electrical discharge frequency, and the drive trajectory are included will be described as an example.

The training data storage unit 52 stores, as a database, the relationship between the acquired training data, that is, the machining specification values of the workpiece 11, the inter-electrode average voltage, machining speed, electrical discharge frequency, drive trajectory, and command value information of the calculation target in each time of machining, and the measurement result. The training data stored in the training data storage unit 52 is used in the utilization phase to be described later.

The model generation unit 53 learns a first calculation target command value, which is a command value of the calculation target, based on the learning data created based on the combination of the machining specification values, inter-electrode average voltage, machining speed, electrical discharge frequency, and drive trajectory output from the data acquisition unit 51 and the command value information of the calculation target, which is answer data. That is, the learned model for inferring the optimum first calculation target command value from the machining specification values, inter-electrode average voltage, machining speed, electrical discharge frequency, and drive trajectory, and the command value information of the calculation target is generated. Here, the learning data is data in which the machining specification values, inter-electrode average voltage, machining speed, electrical discharge frequency, and drive trajectory are associated with the command value information of the calculation target. Here, the learning data is the combination of the machining specification values, inter-electrode average voltage, machining speed, electrical discharge frequency, and drive trajectory and the command value information of the calculation target, but may be the combination of the machining specification values, at least one piece of data selected from the inter-electrode average voltage, machining speed, discharge frequency, and drive trajectory, and the command value information of the calculation target. Note that the command value information of the calculation target used in generating the learned model is data expressing the desired shape as a command value.

As a learning algorithm that is used by the model generation unit 53, a known algorithm such as supervised learning can be used. As an example, a case where a neural network is applied will be described.

In one example, the model generation unit 53 learns the first calculation target command value using what is called supervised learning according to the neural network model. Here, supervised learning refers to a model that provides pairs of inputs and labels that are results to the learning device 50 to learn features in those learning data and infer results from inputs.

The neural network includes an input layer composed of a plurality of neurons, an intermediate layer composed of a plurality of neurons, and an output layer composed of a plurality of neurons. The number of intermediate layers, which are also referred to as hidden layers, may be one or may be two or more.

Figure 15:
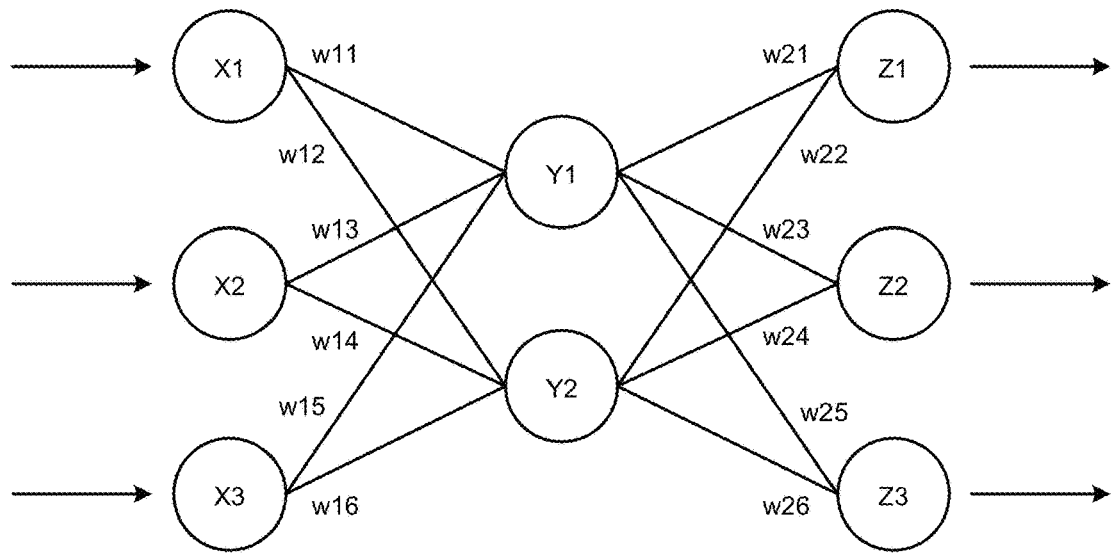
FIG. 15 is a diagram schematically illustrating an example of a neural network used by the model generation unit.

FIG. 15 is a diagram schematically illustrating an example of a neural network used by the model generation unit. In one example, in the case of a three-layer neural network as illustrated in FIG. 15, a plurality of inputs are input to the input layers X1 to X3, and these values are multiplied by weights represented by w11 to w16 and input to the intermediate layers Y1 to Y2. The weights w11 to w16 are referred to as weights w1 when not individually distinguished. In addition, the results of the intermediate layers Y1 to Y2 are further multiplied by weights represented by w21 to w26, and output from the output layers Z1 to Z3. The weights w21 to w26 are referred to as weights w2 when not individually distinguished. The output results of the output layers Z1 to Z3 vary depending on the values of the weights w1 and w2.

In the sixth embodiment, the neural network learns the first calculation target command value through what is called supervised learning according to the learning data created based on the combination of the machining specification values, inter-electrode average voltage, machining speed, electrical discharge frequency, and drive trajectory acquired by the data acquisition unit 51, and the command value information of the calculation target.

That is, the neural network learns by adjusting the weights w1 and w2 such that the result output from the output layer in response to the input of the machining specification values, inter-electrode average voltage, machining speed, electrical discharge frequency, and drive trajectory to the input layer approaches the command value information of the calculation target.

The model generation unit 53 executes learning in the above-described manner to generate and output a learned model.

The learned model storage unit 54 stores the learned model output from the model generation unit 53.

Figure 16:
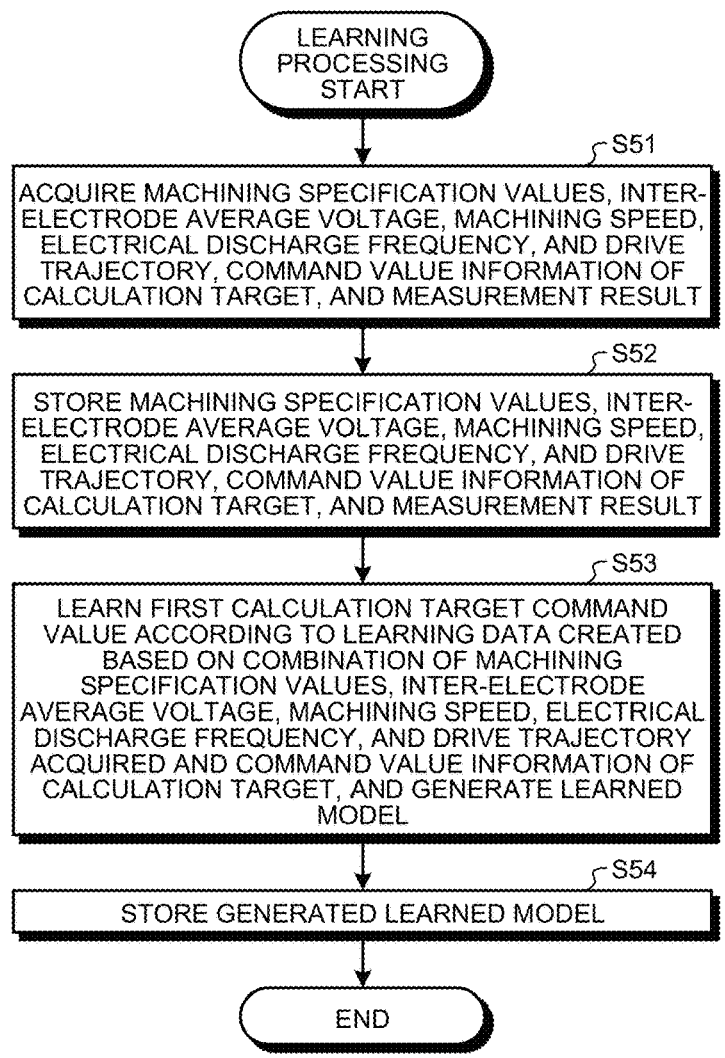
FIG. 16 is a flowchart illustrating an exemplary procedure for learning processing by the learning device according to the sixth embodiment.

Next, learning processing by the learning device 50 will be described. FIG. 16 is a flowchart illustrating an exemplary procedure for learning processing by the learning device according to the sixth embodiment. First, the data acquisition unit 51 acquires the machining specification values, inter-electrode average voltage, machining speed, electrical discharge frequency, and drive trajectory, the command value information of the calculation target, which is answer data, and the measurement result (step S51). Here, the machining specification values, inter-electrode average voltage, machining speed, electrical discharge frequency, and drive trajectory, the command value information of the calculation target, and the measurement result are simultaneously acquired. However, the machining specification values, inter-electrode average voltage, machining speed, electrical discharge frequency, and drive trajectory, the command value information of the calculation target, and the measurement result only need to be input in association with each other, and data of the machining specification values, inter-electrode average voltage, machining speed, electrical discharge frequency, and drive trajectory, the command value information of the calculation target, and the measurement result may be acquired at different timings.

Next, the training data storage unit 52 stores the machining specification values, inter-electrode average voltage, machining speed, electrical discharge frequency, and drive trajectory, the command value information of the calculation target, and the measurement result (step S52).

Thereafter, the model generation unit 53 learns the first calculation target command value through what is called supervised learning according to the learning data created based on the combination of the machining specification values, inter-electrode average voltage, machining speed, electrical discharge frequency, and drive trajectory acquired by the data acquisition unit 51 and the command value information of the calculation target, and generates a learned model (step S53).

The learned model storage unit 54 stores the learned model generated by the model generation unit 53 (step S54). Thus, the processing ends.

<Utilization Phase>

Figure 17:
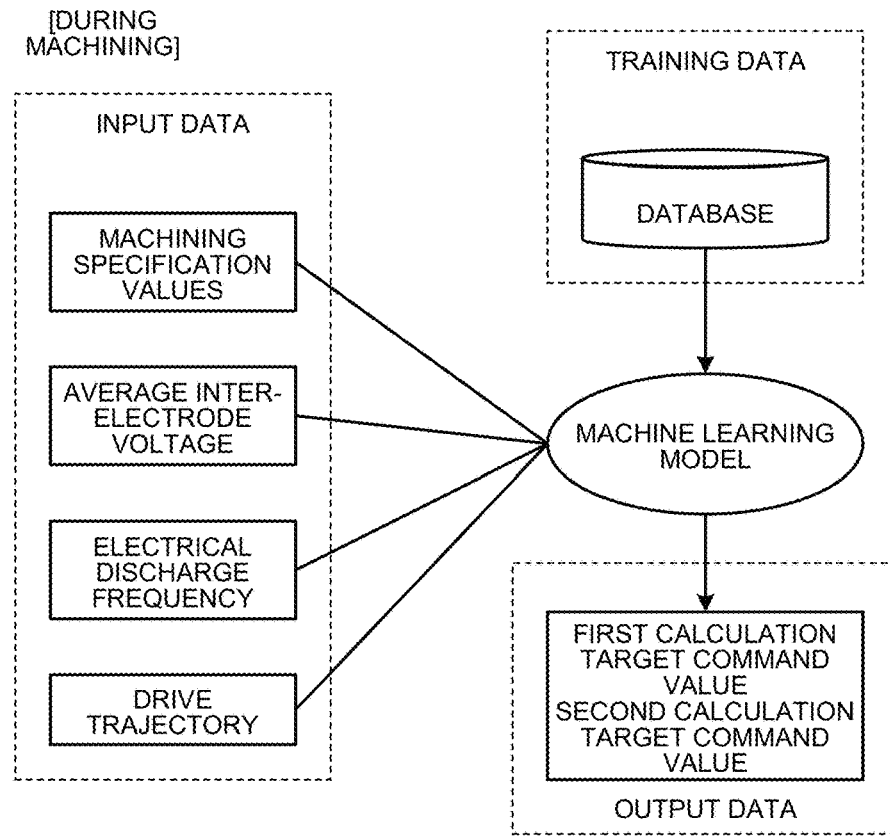
FIG. 17 is a model diagram illustrating an example of the outline of machine learning according to the sixth embodiment.

Next, machining as the utilization phase will be described. FIG. 17 is a model diagram illustrating an example of the outline of machine learning according to the sixth embodiment. At the time of machining, a target value is calculated through machine learning so as to minimize the error from the desired shape, with the profiles in the previous machining or in the previous and earlier machinings as input data, the database as training data, and the first calculation target command value and second calculation target command value, which are command values of calculation targets, as output data. This makes it possible to compensate for the formula representing the modeled relationship between the inter-electrode distance and the calculation target and the error in actual machining through machine learning. As a model of such machine learning, any algorithm such as neighbor regression or Bayesian optimization may be used.

Figure 18:
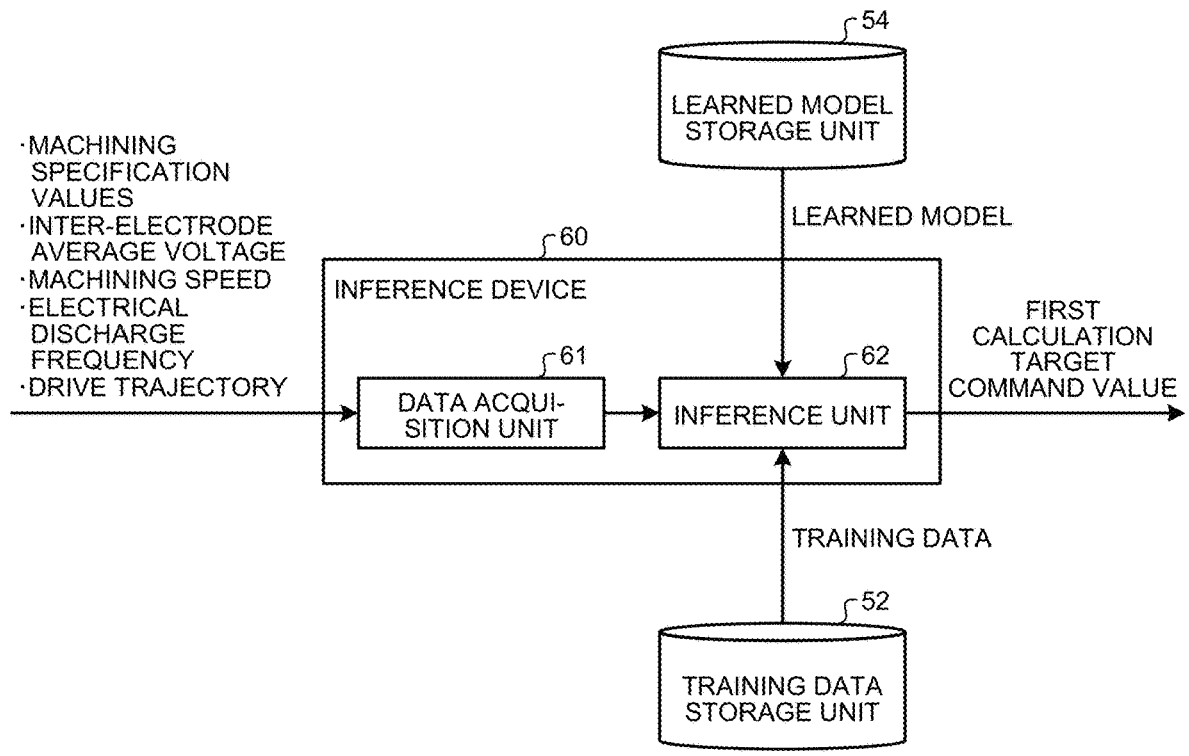
FIG. 18 is a diagram schematically illustrating an exemplary configuration of an inference device used in the control device for the wire spark erosion machine according to the sixth embodiment.

FIG. 18 is a diagram schematically illustrating an exemplary configuration of an inference device used in the control device for the wire spark erosion machine according to the sixth embodiment. The inference device 60 includes a data acquisition unit 61 and an inference unit 62.

The data acquisition unit 61 acquires the machining specification values, inter-electrode average voltage, machining speed, electrical discharge frequency, and drive trajectory. In one example, the data acquisition unit 61 acquires the machining specification values, inter-electrode average voltage, machining speed, electrical discharge frequency, and drive trajectory in the previous (n−1)-th machining.

The inference unit 62 infers the first calculation target command value obtained using the learned model. That is, by inputting the machining specification values, inter-electrode average voltage, machining speed, electrical discharge frequency, and drive trajectory acquired by the data acquisition unit 61 to the learned model, the first calculation target command value can be inferred from the machining specification values, inter-electrode average voltage, machining speed, electrical discharge frequency, and drive trajectory. In the described example, the first calculation target command value is inferred from the machining specification values, inter-electrode average voltage, machining speed, electrical discharge frequency, and drive trajectory. However, the first calculation target command value may be inferred from the machining specification values and at least one piece of data selected from the inter-electrode average voltage, the machining speed, the electrical discharge frequency, and the drive trajectory. In this case, a learned model for inferring the first calculation target command value from the machining specification values and at least one piece of data selected from the inter-electrode average voltage, the machining speed, the electrical discharge frequency, and the drive trajectory is used. In the inference of the first calculation target command value, the input data does not include the measurement result. This is because there is no need to intentionally make unevenness in the shape obtained as a result of machining, and a command value that produces the smallest shape variation is inferred.

Upon inferring the first calculation target command value using the learned model, the inference unit 62 calculates the second calculation target command value, which is a command value of another calculation target that minimizes the error from the desired shape when the correction value of the calculation target is set to the first calculation target command value, using the training data in the training data storage unit 52. The second calculation target command value of another calculation target is the command value of at least one remaining calculation target excluding the calculation target that is the first calculation target command value from among the correction value of the machining speed, the correction value of the electrical discharge frequency, and the correction value of the drive trajectory. The training data storage unit 52 stores, as a database, the relationship between the machining specification values of the workpiece 11, the inter-electrode average voltage, machining speed, electrical discharge frequency, drive trajectory, and command value information of the calculation target in each time of machining, and the measurement result. Therefore, in the sixth embodiment, after estimating the first calculation target command value using the learned model, the inference unit 62 computes a change in error associated with changing the command value of another calculation target except the first calculation target command value, in one example, any of the machining speed, the electrical discharge frequency, and the drive trajectory, using the training data stored in the training data storage unit 52, and obtains and outputs the second calculation target command value of the calculation target that minimizes the error. That is, the inference unit 62 learns and calculates, using the training data in the training data storage unit 52, the second calculation target command value of another calculation target that minimizes the error from the desired shape when the correction value of the calculation target is set to the first calculation target command value.

In the description of the sixth embodiment, the first calculation target command value is inferred using the learned model learned by the model generation unit 53 of the control device for the wire spark erosion machine 1, and the second calculation target command value of another calculation target that minimizes the error when the correction value of the calculation target is set to the first calculation target command value is output. However, a learned model may be acquired from the outside, for example, from the control device for another wire spark erosion machine 1, the first calculation target command value may be inferred based on the learned model, and the second calculation target command value of another calculation target that minimizes the error when the correction value of the calculation target is set to the first calculation target command value may be output.

Figure 19:
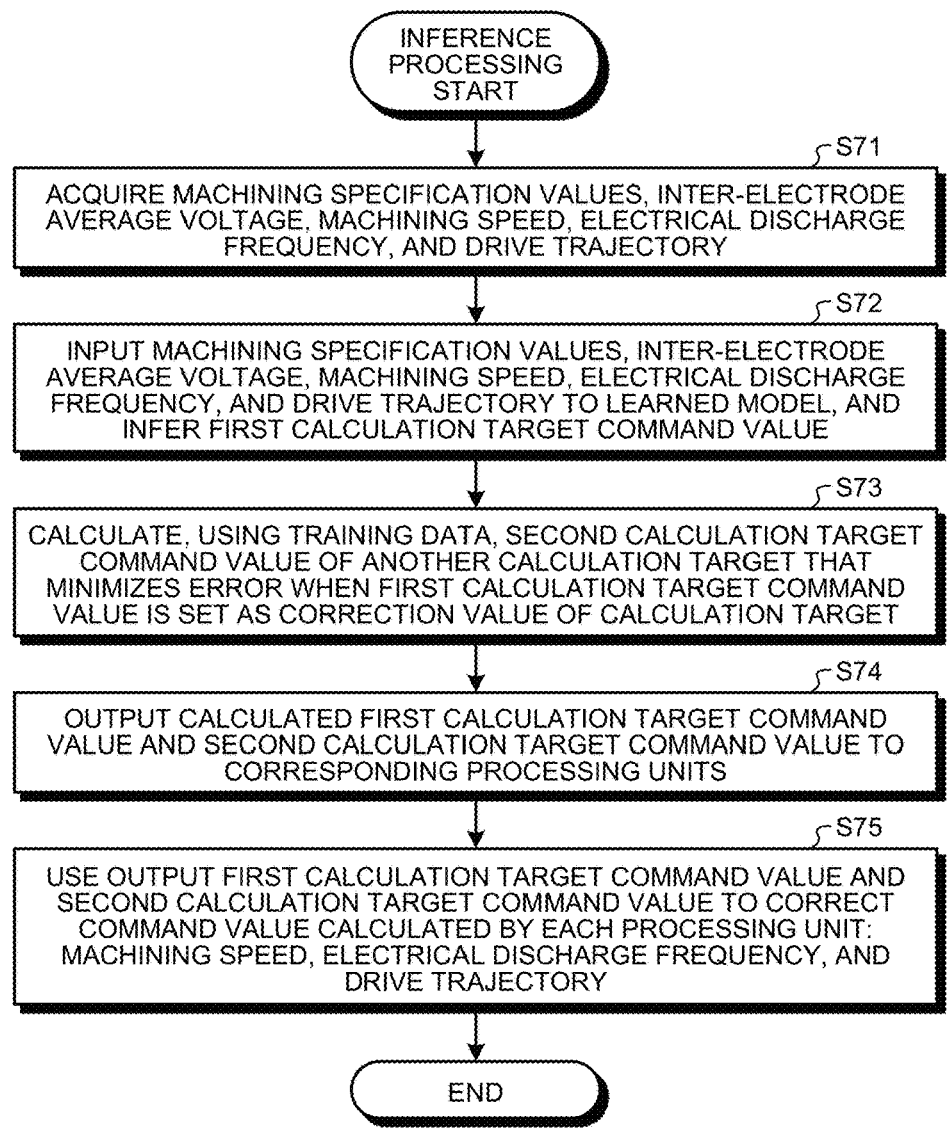
FIG. 19 is a flowchart illustrating an exemplary procedure for inference processing by the inference device according to the sixth embodiment.

Next, inference processing by the inference device 60 will be described. FIG. 19 is a flowchart illustrating an exemplary procedure for inference processing by the inference device according to the sixth embodiment. First, the data acquisition unit 61 acquires the machining specification values, inter-electrode average voltage, machining speed, electrical discharge frequency, and drive trajectory (step S71).

Next, the inference unit 62 inputs the machining specification values, inter-electrode average voltage, machining speed, electrical discharge frequency, and drive trajectory to the learned model stored in the learned model storage unit 54, and infers the first calculation target command value (step S72). Thereafter, the inference unit 62 calculates, using the training data in the training data storage unit 52, the second calculation target command value of another calculation target that minimizes the error when the first calculation target command value obtained by the learned model is set as the correction value of the calculation target (step S73).

Thereafter, the inference unit 62 outputs the calculated first calculation target command value and second calculation target command value to the corresponding processing units in the machining speed control unit 34c, the machining power supply control unit 22, and the drive trajectory control unit 31 (step S74).

Each processing unit then uses the output first calculation target command value and second calculation target command value to correct the command value calculated by each processing unit, namely the machining speed, the electrical discharge frequency, and the drive trajectory (step S75). This makes it possible to perform machining according to the desired shape.

Note that the model generation unit 53 may learn the first calculation target command value according to the learning data created for the control devices for a plurality of wire spark erosion machines 1. Note that the model generation unit 53 may acquire learning data from the control devices for a plurality of wire spark erosion machines 1 used in the same area, or may learn the first calculation target command value using learning data collected from the control devices for a plurality of wire spark erosion machines 1 operating independently in different areas. In addition, in the middle of learning, it is possible to start collecting learning data from the control device for a new wire spark erosion machine 1, or stop collecting learning data from the control device for some wire spark erosion machine. Furthermore, the learning device 50 that has learned the first calculation target command value for the control device for a certain wire spark erosion machine 1 may be applied to the control device for a different wire spark erosion machine 1, and the first calculation target command value may be relearned and updated for the control device for the different wire spark erosion machine 1.

In addition, the learning device 50 and the inference device 60, which are used to learn the first calculation target command value of the control device for the wire spark erosion machine 1, may be in one example a device separate from the control device for the wire spark erosion machine 1 and connected to the control device for the wire spark erosion machine 1 via a network. In addition, the learning device 50 and the inference device 60 may be built in the control device for the wire spark erosion machine 1. Furthermore, the learning device 50 and the inference device 60 may exist on a cloud server.

In the sixth embodiment, the first calculation target command value is learned based on the learning data created based on the combination of the machining specification values, inter-electrode average voltage, machining speed, electrical discharge frequency, and drive trajectory and the command value information of the calculation target, which is answer data, and a learned model for inferring the first calculation target command value is generated. Then, the machining specification values, inter-electrode average voltage, machining speed, electrical discharge frequency, and drive trajectory in the previous machining are input to the learned model, and the first calculation target command value in the current machining is inferred. When the correction value of the calculation target is set to the first calculation target command value, the second calculation target command value, which is the command value of another calculation target that minimizes the error from the desired shape, is calculated using training data which are the machining specification values, the inter-electrode average voltage, machining speed, electrical discharge frequency, drive trajectory, and command value information of the calculation target in each machining, and the measurement result stored as a database. With a formula representing the modeled relationship between the inter-electrode distance and the calculation target as in the first to fifth embodiments, in practice, the value may not be able to be calculated optimally due to, for example, deflection of the electrode due to the distance between the upper and lower nozzles at the time of machining, the thickness of the workpiece 11, the machining fluid pressure or the like, or occurrence of electrical discharge backward in the electrode progress direction that appears at a minute corner. However, in the sixth embodiment, even when deflection of the electrode due to the distance between the upper and lower nozzles at the time of machining, the thickness of the workpiece 11, the machining fluid pressure, or the like, occurrence of electrical discharge rearward in the electrode progress direction that appears at a minute corner, or the like occurs, the target value can be optimized through machine learning from the relationship between the profiles of the inter-electrode average voltage, machining speed, electrical discharge frequency, and drive trajectory obtained through preliminary machining and the measurement result.

Figure 20:
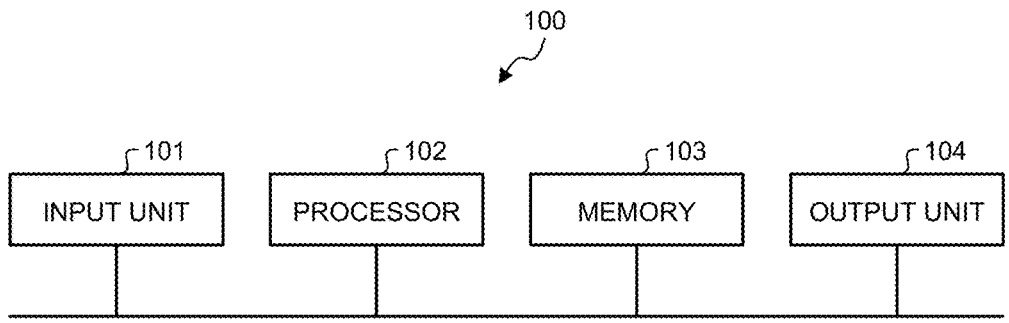
FIG. 20 is a diagram illustrating an exemplary configuration of the hardware of the control device for the wire spark erosion machine according to the first to sixth embodiments.

The machining power supply control unit 22 and the control unit 30 described in the first to sixth embodiments correspond to the control device for the wire spark erosion machine 1. Next, a hardware configuration for implementing the control device will be described. The control device is implemented by processing circuitry that is a circuit in which a processor executes software. In one example, the processing circuitry that executes software is the control circuit illustrated in FIG. 20. FIG. 20 is a diagram illustrating an exemplary configuration of the hardware of the control device for the wire spark erosion machine according to the first to sixth embodiments. The control circuit 100 includes an input unit 101, a processor 102, a memory 103, and an output unit 104.

The input unit 101 is an interface circuit that receives data input from the outside of the control circuit 100 and provides data to the processor 102. The output unit 104 is an interface circuit that transmits data from the processor 102 or the memory 103 to the outside of the control circuit 100. In a case where the processing circuitry is the control circuit 100 illustrated in FIG. 20, the processor 102 reads and executes the program corresponding to each of the components of the machining power supply control unit 22 and the control unit 30 stored in the memory 103, whereby each of the components is implemented. The memory 103 is also used as a temporary memory for each process performed by the processor 102. The processor 102 may output data such as computation results to the memory 103 and cause the memory 103 to store the data, or may cause an auxiliary storage device to store data such computation results via the volatile memory of the memory 103.

The processor 102 is a central processing unit (CPU, also referred to as a central machining device, a machining device, a computation device, a microprocessor, a microcomputer, a processor, or a digital signal processor (DSP)). Examples of the memory 103 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read only memory (EEPROM, registered trademark), and the like.

FIG. 20 is an example of hardware for implementing each of the components of the machining power supply control unit 22 and the control unit 30 with the general-purpose processor 102 and memory 103, but each of the components may be implemented by a dedicated hardware circuit. The processing circuitry that is a dedicated hardware circuit is a single circuit, a composite circuit, a programmed processor, a parallel programmed processor, an application specific integrated circuit (ASIC), a field programmable gate array (FPGA), or a circuit including a combination thereof. Each of the components may be implemented by a combination of the control circuit 100 and a dedicated hardware circuit.

The configurations described in the above-mentioned embodiments indicate examples. The embodiments can be combined with another well-known technique and with each other, and some of the configurations can be omitted or changed in a range not departing from the gist.

REFERENCE SIGNS LIST 1, 1a, 1b, 1c wire spark erosion machine; 10 machining electrode; 11 workpiece; 20 power supply unit; 21 machining power supply; 22, 22a machining power supply control unit; 30 control unit; 31, 31b drive trajectory control unit; 32 inter-electrode average voltage detection unit; 33 voltage computation unit; 34, 34a, 34b, 34c machining speed control unit; 35 drive control unit; 36 inter-electrode average voltage storage unit; 37 electrical discharge frequency storage unit; 38 machining speed storage unit; 39 drive trajectory storage unit; 40, 222, 312, 342 computation device; 50 learning device; 51, 61 data acquisition unit; 52 training data storage unit; 53 model generation unit; 54 learned model storage unit; 60 inference device; 62 inference unit; 221 electrical discharge frequency control unit; 311 drive trajectory calculation unit; 341 machining speed calculation unit.

The invention claimed is:

1. A control device for a wire spark erosion machine that machines a workpiece by applying a voltage between the workpiece and an electrode and causing electrical discharge, the control device being configured to control a drive trajectory of the electrode with respect to the workpiece, a relative machining speed between the workpiece and the electrode, and an electrical discharge frequency of a voltage periodically applied between the electrode and the workpiece, the control device comprising:

a storage circuitry to store at least one piece of data selected from an inter-electrode average voltage that is a voltage applied between the workpiece and the electrode, the electrical discharge frequency, the machining speed, and the drive trajectory in an (n−1)-th machining out of n times of machining in a predetermined machining section of the workpiece, where n is an integer of two or more; and a computation circuitry to calculate an inter-electrode distance in an n-th machining using a calculation model indicating a relationship between the data in the (n−1)-th machining and a machining shape of the workpiece, and compute, from the inter-electrode distance in the n-th machining, at least one command value selected from the machining speed, the electrical discharge frequency, and the drive trajectory in the n-th machining corresponding to a machining amount required for achieving a desired shape that is based on a machining program for machining the machining section.

2. The control device for the wire spark erosion machine according to claim 1, wherein
the storage circuitry further stores at least one piece of the data selected from the inter-electrode average voltage, the electrical discharge frequency, the machining speed, and the drive trajectory in a machining before the (n−1)-th machining, and
the computation circuitry computes at least one command value selected from the machining speed, the electrical discharge frequency, and the drive trajectory in the n-th machining using the calculation model indicating a relationship between the data in the (n−1)-th and earlier machinings and the machining shape of the workpiece.

3. The control device for the wire spark erosion machine according to claim 1, further comprising a command value calculation circuitry to compute at least one command value of the machining speed, the electrical discharge frequency, and the drive trajectory using at least one of the inter-electrode average voltage, the electrical discharge frequency, and the drive trajectory in the n-th machining, and correct the command value computed with the at least one command value selected from the machining speed, the electrical discharge frequency, and the drive trajectory in the n-th machining computed by the computation circuitry.

4. The control device for the wire spark erosion machine according to claim 1, wherein when the machining section has a linear shape, the calculation model includes a function indicating a relationship between at least one piece of the data selected from the inter-electrode average voltage, the electrical discharge frequency, the machining speed, and the drive trajectory in the (n−1)-th machining, and the machining shape of the workpiece.

5. The control device for the wire spark erosion machine according to claim 2, wherein when the machining section has a linear shape, the calculation model includes a function indicating a relationship between at least one piece of the data selected from the inter-electrode average voltage, the electrical discharge frequency, the machining speed, and the drive trajectory in the (n−1)-th and earlier machinings, and the machining shape of the workpiece.

6. The control device for the wire spark erosion machine according to claim 1, wherein when the machining section is a corner portion having a curved shape, the calculation model includes a function indicating a relationship between a corner diameter and an opening angle of the corner portion, at least one piece of the data selected from the inter-electrode average voltage, the electrical discharge frequency, the machining speed, and the drive trajectory in the (n−1)-th machining, and a shape of the workpiece.

7. The control device for the wire spark erosion machine according to claim 2, wherein when the machining section is a corner portion having a curved shape, the calculation model includes a function indicating a relationship between a corner diameter and an opening angle of the corner portion, at least one piece of the data selected from the inter-electrode average voltage, the electrical discharge frequency, the machining speed, and the drive trajectory in the (n−1)-th and earlier machinings, and a shape of the workpiece.

8. The control device for the wire spark erosion machine according to claim 1, further comprising a learning device including:
a data acquisition circuitry to acquire training data including machining specification values of the workpiece in preliminary machining, at least one piece of data selected from the inter-electrode average voltage, the machining speed, the electrical discharge frequency, and the drive trajectory in each machining, and calculation value information that is a target of the command value; and
a model generation circuitry to generate a learned model for inferring a first calculation target command value that is a target of the command value from the machining specification values and at least one piece of data selected from the inter-electrode average voltage, the machining speed, the electrical discharge frequency, and the drive trajectory acquired by the data acquisition circuitry.

9. The control device for the wire spark erosion machine according to claim 1, further comprising an inference device including:
a training data storage circuitry to store training data indicating a relationship between machining specification values of the workpiece in preliminary machining, the inter-electrode average voltage, the machining speed, the electrical discharge frequency, the drive trajectory, and calculation value information that is a target of the command value in each of machinings, and a measurement result indicating a deviation of a machining shape from a desired shape in each of the machinings;
a data acquisition circuitry to acquire machining specification values of the workpiece and at least one piece of data selected from the inter-electrode average voltage, the machining speed, the electrical discharge frequency, and the drive trajectory in the (n−1)-th machining; and
an inference circuitry to, using a learned model for inferring a first calculation target command value that is a command value of a calculation target in the n-th machining from the machining specification values and at least one piece of data selected from the inter-electrode average voltage, the machining speed, the electrical discharge frequency, and the drive trajectory in the (n−1)-th machining, infer the first calculation target command value from the machining specification values and at least one piece of data selected from the inter-electrode average voltage, the machining speed, the electrical discharge frequency, and the drive trajectory in the (n−1)-th machining acquired by the data acquisition circuitry, and calculate, using the training data, a second calculation target command value that is a command value of another calculation target that minimizes an error from a desired shape when the command value of the calculation target is set to the first calculation target command value.

10. A control method for a wire spark erosion machine that machines a workpiece by applying a voltage between the workpiece and an electrode and causing electrical discharge, the control method being used to control a drive trajectory of the electrode with respect to the workpiece, a relative machining speed between the workpiece and the electrode, and an electrical discharge frequency of a voltage periodically applied between the electrode and the workpiece, the control method comprising:
    storing, by a storage circuitry, at least one piece of data selected from an inter-electrode average voltage that is a voltage applied between the workpiece and the electrode, the electrical discharge frequency, the machining speed, and the drive trajectory in an (n−1)-th machining out of n times of machining in a predetermined machining section of the workpiece, where n is an integer of two or more; and
    calculating, by a computation circuitry, an inter-electrode distance in an n-th machining using a calculation model indicating a relationship between the data in the (n−1)-th machining and a machining shape of the workpiece, and computing, by a computation circuitry, from the inter-electrode distance in the n-th machining, at least one command value selected from the machining speed, the electrical discharge frequency, and the drive trajectory in the n-th machining corresponding to a machining amount required for achieving a desired shape that is based on a machining program for machining the machining section.

11. The control device for the wire spark erosion machine according to claim 2, further comprising a command value calculation circuitry to compute at least one command value of the machining speed, the electrical discharge frequency, and the drive trajectory using at least one of the inter-electrode average voltage, the electrical discharge frequency, and the drive trajectory in the n-th machining, and correct the command value computed with the at least one command value selected from the machining speed, the electrical discharge frequency, and the drive trajectory in the n-th machining computed by the computation circuitry.

* * * * *